US012737238B2

(12) United States Patent
Lee et al.

(10) Patent No.: US 12,737,238 B2
(45) Date of Patent: Sep. 15, 2026

(54) PROVISIONING METHOD FOR CLOUD SERVICE AND SYSTEM THEREOF

(71) Applicant: SAMSUNG SDS CO., LTD., Seoul (KR)

(72) Inventors: Hyo Jung Lee, Seoul (KR); Thanh-Tung Nguyen, Seoul (KR); Thanh-Cuong Nguyen, Seoul (KR); Viet-Anh Nguyen, Seoul (KR); Thi-Thanh-Lam Vu, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 590 days.

(21) Appl. No.: 18/195,620

(22) Filed: May 10, 2023

(65) Prior Publication Data

US 2023/0367656 A1 Nov. 16, 2023

(30) Foreign Application Priority Data

May 10, 2022 (KR) ........................ 10-2022-0057002
May 18, 2022 (KR) ........................ 10-2022-0060752
Jan. 20, 2023 (KR) ........................ 10-2023-0008832

(51) Int. Cl.
*G06F 9/46* (2006.01)
*G06F 9/50* (2006.01)

(52) U.S. Cl.
CPC .................................. *G06F 9/5088* (2013.01)

(58) Field of Classification Search
CPC ..................................................... G06F 9/5088
See application file for complete search history.

(56) References Cited

U.S. PATENT DOCUMENTS 8,291,424 B2 * 10/2012 McLean .................... G06F 9/50 718/1
9,253,053 B2 * 2/2016 Nelke ................. H04L 41/5051
9,639,875 B1 * 5/2017 Elliott ................ G06Q 30/0611
10,713,072 B1 7/2020 Burgin et al.
11,204,795 B2 12/2021 Bonaud et al.
11,714,682 B1 * 8/2023 Shahane ............... G06F 9/5022 718/1
12,367,055 B2 * 7/2025 Bonnal Conduzorgues ............... G06F 9/5072
2020/0007631 A1 * 1/2020 Greenstein .......... H04L 43/0876
(Continued)

FOREIGN PATENT DOCUMENTS

CN 111061561 A * 4/2020 ........... G06F 9/5088
CN 113515350 A 10/2021
(Continued)

*Primary Examiner* — Diem K Cao
(74) *Attorney, Agent, or Firm* — Sughrue Mion, PLLC

(57) ABSTRACT

Provided are a provisioning method for cloud service and a system thereof. The provision method according to some embodiments may include collecting a resource utilization rate of each of a plurality of cloud nodes, receiving a regular instance request from a client, determining whether there is a cloud node among the plurality of cloud nodes that satisfies a first condition, in which the collected resource utilization rate is less than a first threshold value, designating a specific cloud node from among the plurality of cloud nodes based on a determination that there is no cloud node that satisfies the first condition, and terminating at least some of spot instances pre-provisioned on the specific cloud node and provisioning a requested regular instance.

18 Claims, 15 Drawing Sheets

(56) References Cited

U.S. PATENT DOCUMENTS

| | | | |
|---|---|---|---|
| 2021/0294651 | A1 | 9/2021 | Misca et al. |
| 2022/0147380 | A1* | 5/2022 | Azaria ................ G06F 9/45558 |

FOREIGN PATENT DOCUMENTS

| | | | |
|---|---|---|---|
| CN | 113778668 | A | 12/2021 |
| JP | 7037059 | B2 | 3/2022 |
| KR | 10-2019-0059661 | A | 5/2019 |
| KR | 10-2037845 | B1 | 10/2019 |
| KR | 10-2021-0092462 | A | 7/2021 |
| KR | 10-2022-0006490 | A | 1/2022 |

* cited by examiner

PROVISIONING METHOD FOR CLOUD SERVICE AND SYSTEM THEREOF

CROSS-REFERENCE TO RELATED APPLICATION(S)

This application claims the benefit of Korean Patent Application No. 10-2022-0057002, filed on May 10, 2022, Korean Patent Application No. 10-2022-0060752, filed on May 18, 2022, and Korean Patent Application No. 10-2023-0008832, filed on Jan. 20, 2023, in the Korean Intellectual Property Office, the disclosures of which are incorporated herein by reference in their entireties.

BACKGROUND

1. Field

The present disclosure relates to a provisioning method and system for a cloud service, and more particularly, to a cloud resource provisioning method for efficiently operating a cloud service and a system for performing the method.

2. Description of the Related Art

In the cloud service, the provisioning process refers to a series of processes, in which a cloud instance is created by allocating limited resources of a physical cloud node according to clients' requests, and the created cloud instance is provided to the requesting client. Since this provisioning process determines the quality of cloud services and the efficiency of use (operation) of cloud resources, many cloud service providers are still trying to devise efficient provisioning algorithms.

On the other hand, most cloud service providing systems provide services using only regular instances that guarantee a usage period and performance. In addition, most cloud service delivery systems perform provisioning by considering only the number of provisioned instances without considering the actual utilization rate of regular instances (e.g., the method of setting the maximum number of instances that can be provisioned and performing provisioning only within that number). In this case, although the actual utilization rate of cloud resources is not high, since additional regular instances cannot be provisioned, the efficiency of use (operation) of cloud resources and the profitability of cloud service providers inevitably decrease.

SUMMARY

A technical problem to be solved through some embodiments of the present disclosure is to provide a provisioning method capable of improving the use (operation) efficiency of cloud resources while ensuring the quality of cloud services, and a system for performing the method.

Another technical problem to be solved through some embodiments of the present disclosure is to provide a method for efficiently performing provisioning in consideration of characteristics of regular instances and spot instances, and a system for performing the method.

The technical problems of the present disclosure are not limited to the above-mentioned technical problems, and other technical problems not mentioned will be clearly understood by those skilled in the art from the description below.

However, the technical problems of the present disclosure are not restricted to the one set forth herein. The above and other technical problems of the present disclosure will become more apparent to one of ordinary skill in the art to which the present disclosure pertains by referencing the detailed description of the present disclosure given below.

According to an aspect of the present disclosure, there is provided a provisioning method performed by at least one computing device for a cloud service. The provisioning method may include collecting a resource utilization rate of each of a plurality of cloud nodes, wherein the resource utilization rate includes a resource utilization rate for at least one of a processor or a memory, receiving a regular instance request from a client, determining whether there is a cloud node among the plurality of cloud nodes that satisfies a first condition, in which the collected resource utilization rate is less than a first threshold value, designating a specific cloud node from among the plurality of cloud nodes based on a determination that there is no cloud node that satisfies the first condition, and terminating at least some of spot instances pre-provisioned on the specific cloud node and provisioning a requested regular instance.

In some embodiments, the collecting the resource utilization rate may include collecting a resource utilization rate of the specific cloud node through a node agent operating on the specific cloud node, and collecting a resource utilization rate of a specific cloud instance through an instance agent operating on the specific cloud instance of the specific cloud node.

In some embodiments, the provisioning the requested regular instance may include designating a termination target from a list of the pre-provisioned spot instances, predicting a resource utilization rate of the specific cloud according to termination of the designated spot instance, and terminating the designated spot instance based on a determination that the predicted resource utilization rate is less than the first threshold value.

In some embodiments, the provisioning method may further include receiving a spot instance request from a client, determining whether there is a cloud node among the plurality of cloud nodes that satisfies a second condition, in which the collected resource utilization rate is less than a second threshold value, and performing provisioning for the requested spot instance based on a result of the determining whether there is the cloud node that satisfies the second condition, wherein the second threshold value is set to a value greater than the first threshold value.

In some embodiments, the provisioning method may further include receiving a plurality of spot instance requests from a client, wherein the requests are received within a current time window, and performing, at a last point of the current time window, provisioning for requested plurality of spot instances.

According to another aspect of the present disclosure, there is provided a provisioning method performed by at least one computing device for a cloud service. The provisioning method may include collecting a resource utilization rate of each of a plurality of cloud nodes, wherein the resource utilization rate includes a resource utilization rate for at least one of a processor or a memory, receiving a regular instance request from at least one client, determining whether there is a cloud node among the plurality of cloud nodes that satisfies a first condition, in which the collected resource utilization rate is less than a first threshold value, determining a source cloud node from among the plurality of cloud nodes based on a determination that there is no cloud node that satisfies the first condition, migrating at least some of spot instances of the source cloud node to a target cloud node, and provisioning a requested regular instance at the source cloud node.

In some embodiments, the determining the source cloud node may include determining whether a first cloud node among the plurality of cloud nodes satisfies the first condition according to spot instance migration or termination, and determining the first cloud node as the source cloud node based on a determination of satisfaction.

In some embodiments, the migrating at least some of the spot instances of the source cloud node may include determining the target cloud node from among the plurality of cloud nodes based on the number of spot instances that can be provisioned, and migrating at least some of spot instances of the source cloud node to the determined target cloud node.

In some embodiments, the provisioning method may further include receiving a spot instance request from a client, and provisioning the requested spot instance by using a cloud node among the plurality of cloud nodes that satisfies a second condition, in which the collected resource utilization rate is less than a second threshold value, wherein the second threshold value is set to a value greater than the first threshold value.

According to yet another aspect of the present disclosure, there is provided a provisioning system for a cloud service. The provisioning system may include at least one processor; and at least one memory configured to store computer program executable by the at least one processor, wherein the computer program, when executed by the at least one processor, causes the at least one processor to perform: collecting a resource utilization rate of each of a plurality of cloud nodes, wherein the resource utilization rate includes a resource utilization rate for at least one of a processor or a memory, receiving a regular instance request from a client, determining whether there is a cloud node among the plurality of cloud nodes that satisfies a first condition, in which the collected resource utilization rate is less than a first threshold value, designating a specific cloud node from among the plurality of cloud nodes based on a determination that there is no cloud node that satisfies the first condition; and terminating at least some of spot instances pre-provisioned on the specific cloud node and provisioning the requested regular instance.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
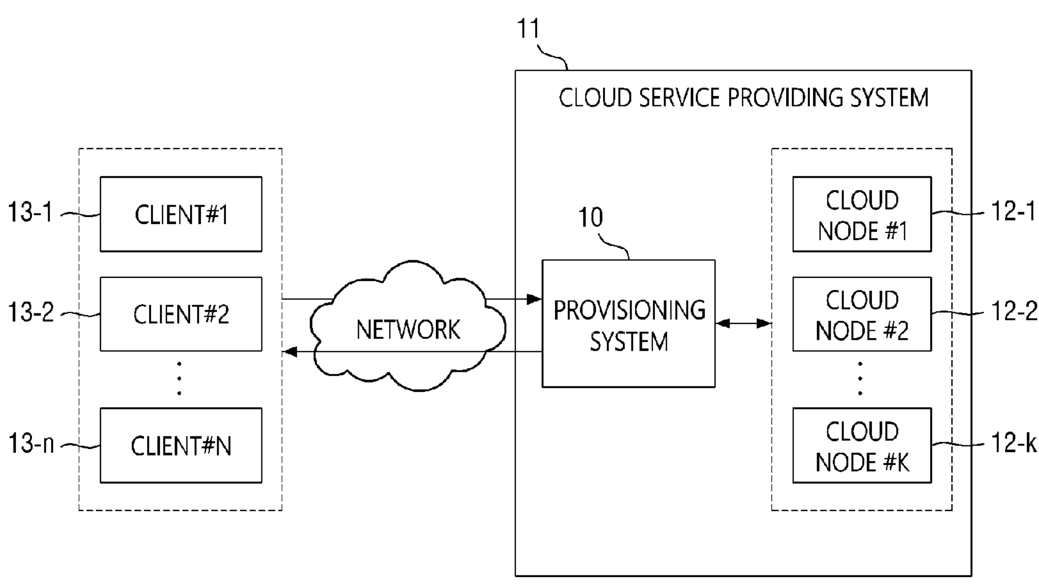
FIG. 1 is an exemplary diagram for describing the configuration and operation of a cloud service providing system according to some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, various embodiments of the present disclosure will be described in detail with reference to the accompanying drawings.

FIG. 1 is an exemplary diagram for describing the configuration and operation of a cloud service providing system 11 according to some embodiments of the present disclosure.

As shown in FIG. 1, the cloud service providing system 11 according to embodiments may be a system that provides a cloud service to at least one client 13-1 to 13-*n*. For example, the cloud service providing system 11 may provide cloud services (e.g., services providing computing resources) by provisioning cloud instances in response to requests from clients 13-1 to 13-*n*. Hereinafter, for convenience of description, the reference number '13' is used to refer to any client (e.g., 13-1) or to collectively refer to all clients 13-1 to 13-*n*.

As shown, the cloud service providing system 11 may be configured to include a provisioning system 10 and a plurality of cloud nodes 12-1 to 12-*k*. Hereinafter, each component of the cloud service providing system 11 will be described. However, for convenience of description, the reference number '12' is used to refer to any cloud node (e.g., 12-1) or to collectively refer to all cloud nodes (12-1 to 12-*k*).

The provisioning system 10 may refer to a computing device(apparatus)/system that performs provisioning for a cloud service. For example, the provisioning system 10 may monitor cloud resources provided by the cloud nodes 12 and performing provisioning of a cloud instance in response to a request of the client 13. In this case, the provisioning system 10 may perform provisioning based on the monitoring result.

For reference, the cloud instance may be used interchangeably with terms such as 'virtual instance,' virtual machine' and 'virtual node' in the art. However, since one cloud node 12 may be configured to provide only one cloud instance, in some cases, the cloud instance may even cover the concept of a 'physical machine.'

The monitoring information for cloud resources may comprise, for example, the total utilization rate of cloud resources (e.g., utilization rate of cloud resources provided by all cloud nodes 12), resource utilization rates of individual cloud nodes 12 (i.e., resource utilization rate per node), resource utilization rates of individual cloud instances (i.e., resource utilization rate per instance), and the like. However, the scope of the present disclosure is not limited thereto.

Also, the cloud resources may include, for example, processor resources, memory resources, storage resources, network resources, and the like. However, the scope of the present disclosure is not limited thereto. However, in the following description, for convenience of understanding, it is assumed that cloud resources are composed of processor resources and memory resources.

The provisioning system 10 may periodically or non-periodically monitor cloud resources. However, a specific monitoring method may vary depending on the embodiment.

Figure 2:
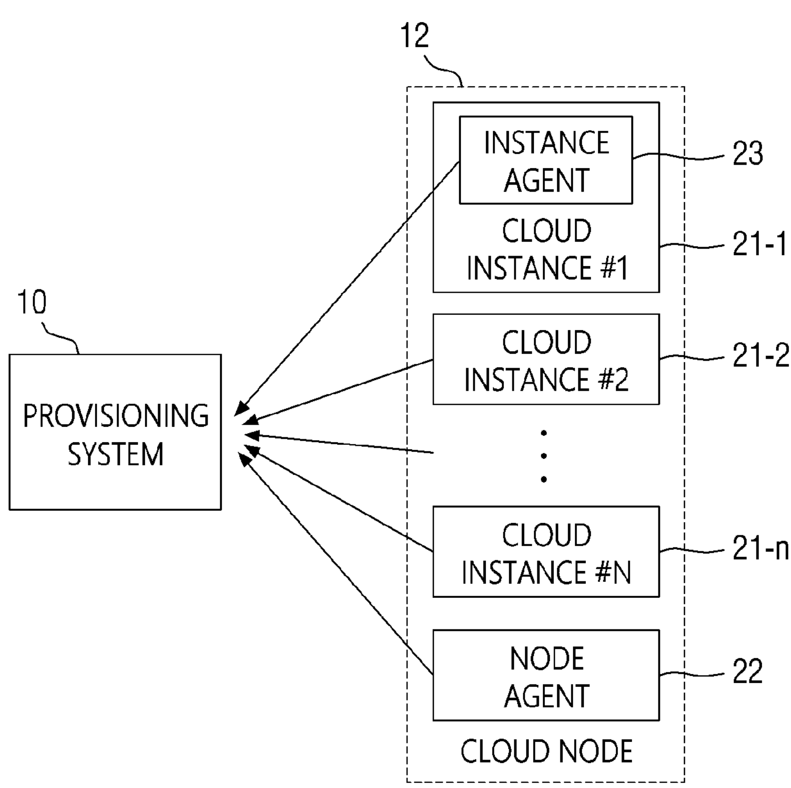
FIG. 2 is an exemplary diagram for describing a cloud resource monitoring method according to some embodiments of the present disclosure.

In some embodiments, as shown in FIG. 2, the provisioning system 10 may, via instance agent 23 and node agent 22, may monitor (or collect) the resource utilization rates of the cloud node 12 and each cloud instance 21-1 to 21-*n*. Here, the instance agent 23 is a module that operates on the cloud instance (e.g., 21-1), and may mean a module that measures and provides the resource utilization rate (e.g., virtual processor utilization rate, virtual memory utilization rate) of the corresponding cloud instance (e.g., 21-1). Of course, the instance agent 23 may further measure other monitoring metrics. Also, the node agent 32 may mean a module that operates on the cloud node 12 and may mean a module that measures and provides a resource utilization rate of the corresponding cloud node 12. According to the present embodiment, the resource utilization rates of the cloud node 12 and the cloud instance 21-1 may be accurately and precisely monitored through different types of agents 22 and 23.

Figure 3:
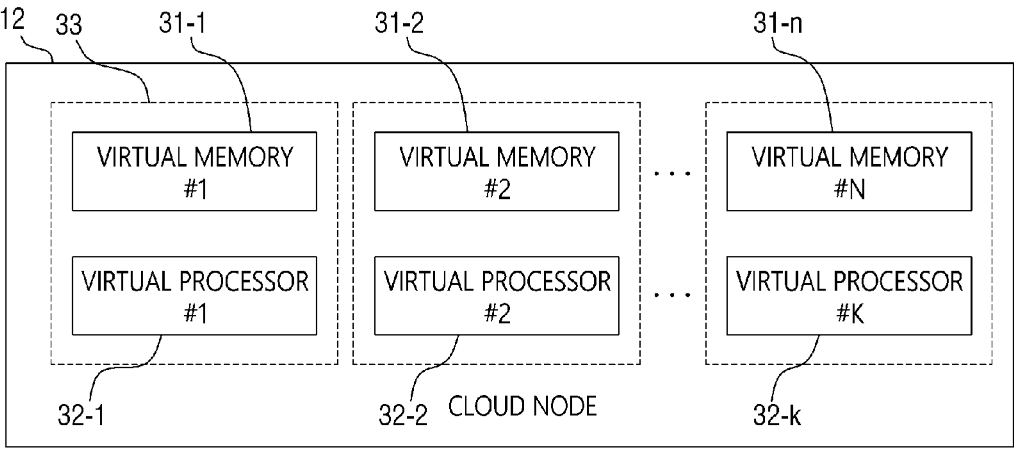
FIG. 3 is an exemplary diagram for describing a relationship between a virtual cloud resource and a cloud instance that may be referred to in various embodiments of the present disclosure.

In addition, the provisioning system 10 may create a cloud instance by allocating (using) a cloud resource according to a request of the client 13. For example, as shown in FIG. 3, the provisioning system 10 may create a cloud instance 33 by allocating (using) virtual processors 32-1 to 32-*k* and virtual memories 31-1 to 31-*n* provided by the cloud node 12, and provide the created cloud instance 33 to the client 13. In this case, the maximum number of virtual processors and the maximum number of virtual memories that may be provided by the cloud node 12 (or allocated to the cloud node 12) may be preset fixed values or may be values that vary according to circumstances. FIG. 3 shows an example, in which the maximum number of virtual processors and the maximum number of virtual memories that the cloud node 12 may provide are 'K' and 'N.' In addition, FIG. 3 illustrates that a cloud instance (e.g., 33) is created using one virtual processor (e.g., 32-1) and one virtual memory (e.g., 31-1) as an example. However, the scope of the present disclosure is not limited to these examples. For example, the provisioning system 10 allocates (and uses) a plurality of virtual processors (e.g., 32-1 and 32-2) and a plurality of virtual memories (e.g., 31-1 and 31-2) to create one cloud instances (e.g., 33).

In the following description, the virtual processor (e.g., 32-1) may be referred to as a 'virtual processor resource,' and the virtual memory (e.g., 31-1) may be referred to as a 'virtual memory resource.' Also, the virtual processor (e.g., 32-1) and the virtual memory (e.g., 31-1) may be referred to as 'virtual cloud resources.'

In the previous example, the maximum numbers of virtual processors and virtual memories may be set to different values or may be set to the same value. Also, the maximum numbers of virtual processors and virtual memories may be set to the same value for each cloud node 12 or may be set to different values. In addition, the amount (size) of resources of each virtual processor or virtual memory may be set to the same value or different values.

Meanwhile, in various embodiments of the present disclosure, the provisioning system 10 may perform provisioning of two types of cloud instances. In other words, the cloud service providing system 11 may provide a cloud service using two types of cloud instances. Specifically, the provisioning system 10 may perform provisioning for a regular instance and a spot instance by reflecting characteristics of each instance. The two instances are cloud instances that offer different SLAs (Service Level Agreements). The regular instances may refer to instances where the requested usage period and performance are guaranteed, and the spot instances may refer to instances where the requested usage period and performance are not guaranteed (i.e., instances that may be terminated unintentionally). Those skilled in the art will already be familiar with the concepts of regular instances and spot instances, so descriptions thereof will be omitted.

Since regular instances and spot instances are instances with different characteristics, the provisioning time, method, and/or algorithm of the two instances may be designed differently.

Figure 4:
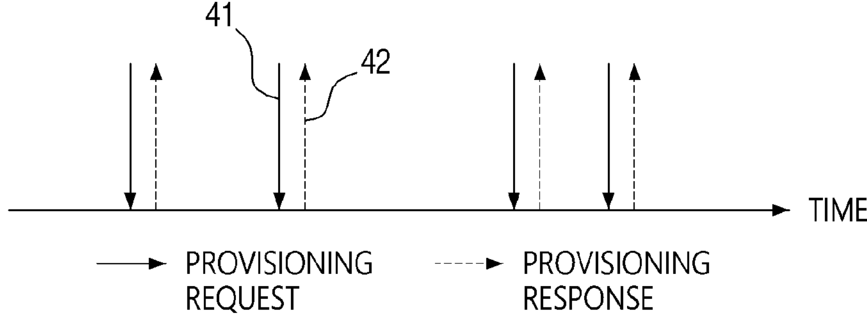
FIG. 4 is an exemplary diagram for describing a provisioning time and method of a regular instance according to some embodiments of the present disclosure.

For example, as shown in FIG. 4, the provisioning system 10 may perform (attempt) immediate provisioning for a regular instance. In other words, the provisioning system 10 immediately performs (attempts) provisioning in response to the regular instance request 41 of the client 13, and provide the provisioning result (42, e.g., success, failure, provisioned cloud instance information, etc.) to the client 13.

Figure 5:
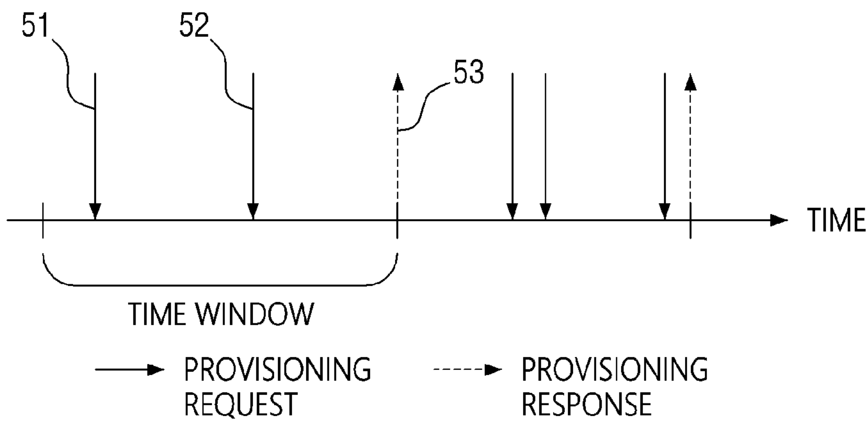
FIG. 5 is an exemplary diagram for describing a provisioning time and method of a spot instance according to some embodiments of the present disclosure.

As another example, as shown in FIG. 5, the provisioning system 10 may perform (attempt) delayed provisioning (or batch provisioning) for spot instances. Specifically, the provisioning system 10 may perform (attempt) batch provisioning for the spot instance requests 51 and 52 received within a time window (i.e., a certain period of time). For instance, the provisioning system 10 may suspend processing (i.e., performs provisioning) for spot instance requests 51 and 52 until reaching the last point of the current time window (e.g., insert requests 51 and 52 into the request queue and wait), and at the last point of the current time window, perform (attempt) batch provisioning for the requested spot instances. And, the provisioning system 10 may provide the performing result 53 to the clients 13. The provisioning system 10 may perform provisioning based on monitoring information on cloud resources and the bid price of the requested spot instance. In this case, the effect of improving the profitability of the cloud service provider due to price competition for the spot instance may be achieved.

In the previous example, the spot instance request (e.g., 51) may further include information about allowable waiting time in addition to the price (i.e., bid price). Here, the allowable waiting time (or maximum waiting time) is a value set by the client 13, and may mean the maximum time to wait until provisioning of the requested spot instance is completed. In this case, the provisioning system 10 may exclude spot instance requests that exceed the allowable waiting time (e.g., spot instance requests that exceed the allowable waiting time when determined at the last point of the time window), and perform provisioning only for the remaining spot instance requests.

The length of the time window may be a preset fixed value or a variable value according to circumstances. For example, the length of the time window may be a value that varies based on the occurrence frequency of spot instance requests, the total utilization rate of cloud resources, the utilization rate of the cloud node 12, the change in utilization rate, the average value of allowable waiting time, etc. (e.g., set the length of the time window longer if the total utilization rate is consistently high, and shorter if vice versa, adjust the length of the time window taking into account the average value of the allowable waiting time, etc.).

A specific method (algorithm) of provisioning a regular instance and a spot instance by the provisioning system 10 will be described in detail with reference to the drawings below FIG. 7.

The aforementioned provisioning system 10 may be implemented with at least one computing device. For example, all functions of the provisioning system 10 may be implemented in one computing device, and a first function of the provisioning system 10 may be implemented in a first computing device and a second function may be implemented in a second computing device. Alternatively, certain functions of the provisioning system 10 may be implemented on a plurality of computing devices.

Figure 16:
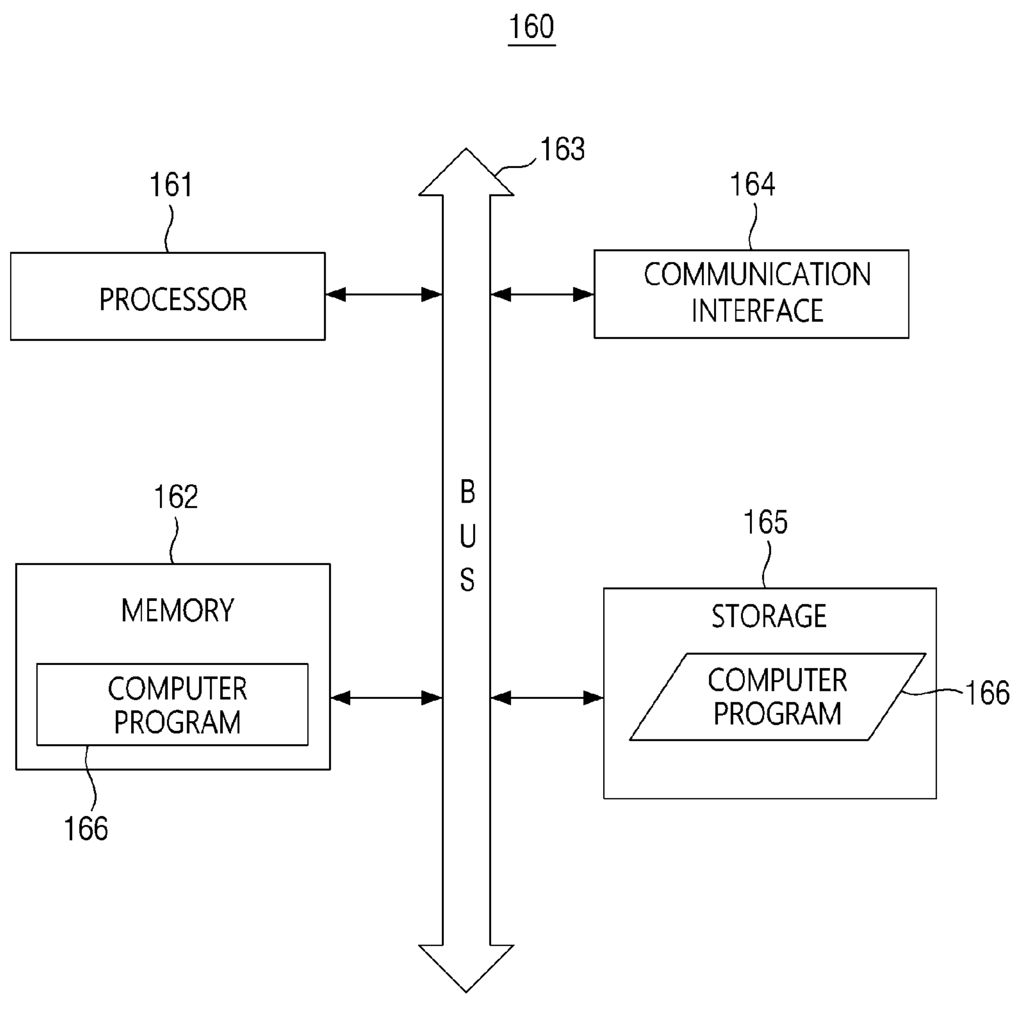
FIG. 16 depicts an example computing device capable of implementing a provisioning system in accordance with some embodiments of the present disclosure.

A computing device may include any device having a computing function, and an example of such a device may be referenced to FIG. 16.

For reference, since a computing device is an aggregate, in which various elements (e.g., memory, processor, etc.) interact with each other, it may be referred to as a 'computing system' in some cases. Of course, the term computing system may also encompass the concept of an aggregate, in which a plurality of computing devices interact with each other.

It will be described with reference to FIG. 1 again.

The cloud node 12 may refer to a physical device (node) that provides cloud resources. For example, the cloud node 12 may provide processor resources and memory resources. In this case, processor resources may be divided into a plurality of virtual processors (that is, logically divided) and provided, and memory resources may also be divided into a plurality of virtual memories and provided. Also, as provisioning is performed, at least one cloud instance may be executed on the cloud node 12 (see FIG. 3).

For reference, the cloud node 12 may be referred to as a 'cloud server,' 'cloud device,' 'computing node,' 'resource node,' 'resource device,' 'physical machine,' 'physical server,' and the like.

The cloud node 12 may also be any device having a computing function, and an example of such a device may be referred to FIG. 16.

Figure 6:
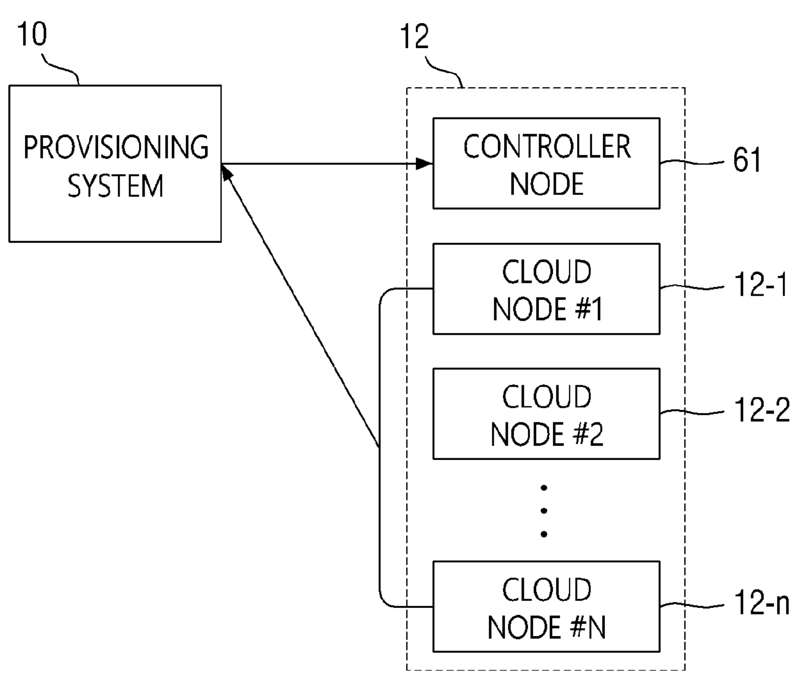
FIG. 6 is an exemplary diagram for describing the configuration and operation of a cloud service providing system according to some embodiments of the present disclosure.

Meanwhile, in some other embodiments of the present disclosure, as shown in FIG. 6, the cloud service providing system 10 may be configured to further include a controller node 61 that controls a plurality of cloud nodes 12 (e.g., cloud instance creation, migration, termination, etc.). In this case, the provisioning system 10 may provision the requested cloud instance by transmitting provisioning information for the requested cloud instance (e.g., provisioning information for the requested regular/spot instance) to the controller node 61.

So far, the configuration and operation of the cloud service providing system 11 according to the embodiments of the present disclosure have been described with reference to FIGS. 1 to 6. Hereinafter, various methods that may be performed in the provisioning system 10 will be described with reference to FIGS. 7 to 15.

Hereinafter, for convenience of understanding, description will be continued on the assumption that the methods to be described later are performed in the provisioning system 10 in the environment illustrated in FIG. 1. In addition, the description will continue on the assumption that all steps/operations of the methods to be described later are performed by the provisioning system 10. Accordingly, when the subject of a specific step/operation is omitted, it may be understood that it is performed in the provisioning system 10. However, in a real environment (or an environment different from that illustrated in FIG. 1), some steps/operations of the method described later may be performed in another computing device.

Figure 7:
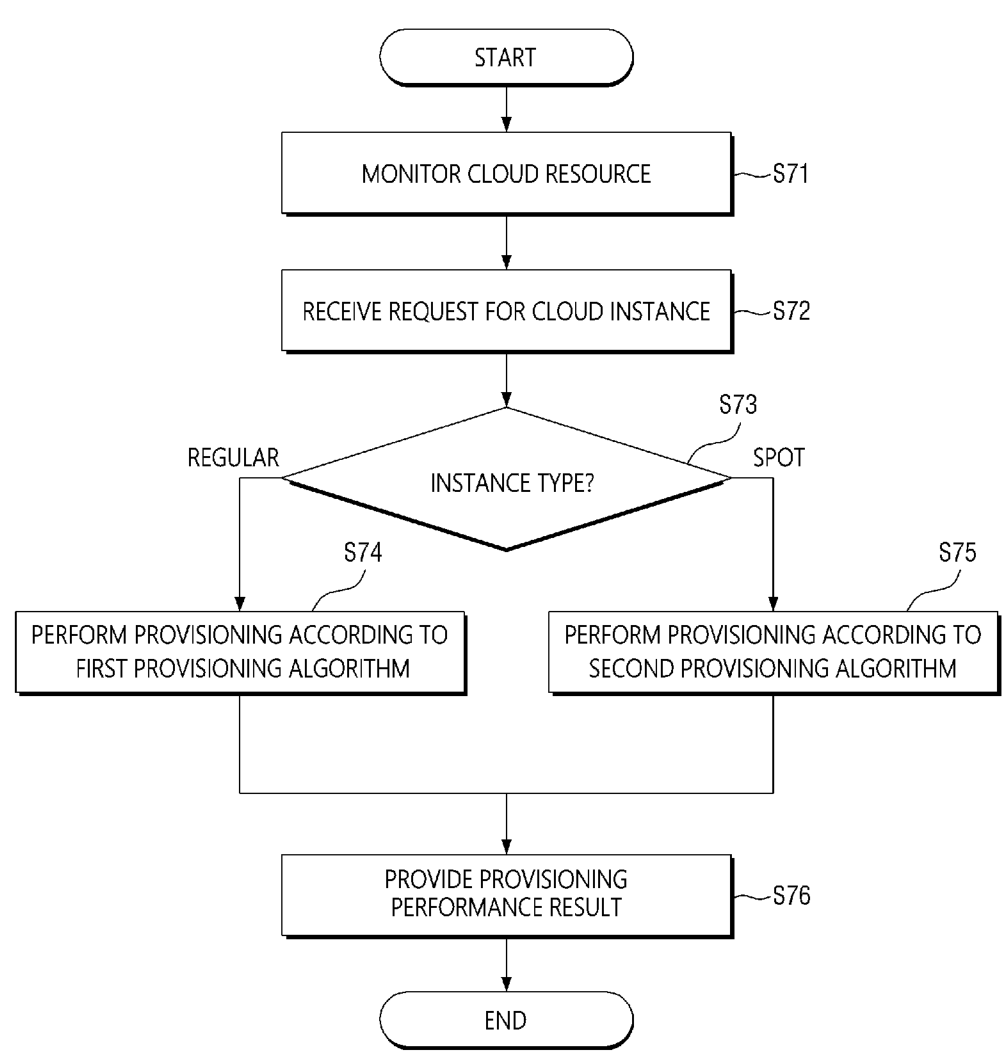
FIG. 7 is an exemplary flow diagram illustrating a provisioning method for a cloud service according to some embodiments of the present disclosure.

FIG. 7 is an exemplary flowchart schematically illustrating a provisioning method for a cloud service according to some embodiments of the present disclosure. However, this is only a preferred embodiment for achieving the object of the present disclosure, and some steps may be added or deleted as needed.

As shown in FIG. 7, the provisioning method according to embodiments may start at step S71 of monitoring cloud resources. For example, the provisioning system 10 may collect information such as the total utilization rate of cloud resources (e.g., the utilization rates of total cloud resources provided by the cloud nodes 12), the resource utilization rate of individual cloud node (e.g., 12), or individual cloud instance (e.g., 31) through resource monitoring. The cloud resources may include, for example, processor resources and memory resources. However, the scope of the present disclosure is not limited thereto.

The above resource utilization rate (e.g., total utilization rate, resource utilization rate of cloud nodes/instances, etc.) may be a value measured at a specific point in time or an average value of utilization rates measured during a unit time (i.e., a certain time interval). In this case, the unit time may be a preset fixed value or a value that varies according to circumstances. For example, when the utilization rate of cloud resources changes rapidly or the occurrence frequency of cloud instance requests increases rapidly, the provisioning system 10 may set the unit time to a smaller value for more accurate (precise) monitoring. In the opposite case, the unit time may be set to a larger value.

In step S72, a request for a cloud instance (or service) may be received. For example, the provisioning system 10 may receive a regular instance request or a spot instance request from at least one client 13.

A request for a cloud instance (i.e., a request message) may include various information used for provisioning. Examples of such information include the type of cloud instance (e.g., regular instance or spot instance) and detailed information of the requested service (or instance). The detailed information on the regular instance may include, for example, a usage period of the instance, required performance, an image to be executed in the instance, an allowable (maximum) price, an amount of processor resources, an amount of memory resources, and the like. In addition, the detailed information on the spot instance may include, for example, a usage period of the instance, required performance, an image to be executed on the instance, a bid price, an amount of processor resources, an amount of memory resources, and allowable waiting time. However, the scope of the present disclosure is not limited thereto.

In step S73, the requested cloud instance type may be determined. If the requested cloud instance is a regular instance, step S74 may be performed, and if the requested cloud instance is a spot instance, step S75 may be performed.

In step S74, provisioning of the requested regular instance may be performed according to the first provisioning algorithm. Details of this step (i.e., the first provisioning algorithm) will be described in detail later with reference to FIGS. 8 to 10, 13 and 14.

In step S75, provisioning of the requested spot instance may be performed according to the second provisioning algorithm. The detailed process of this step (i.e., the second provisioning algorithm) will be described in detail later with reference to FIGS. 11, 12, and 15.

In step S76, a provisioning performance result may be provided. For example, the provisioning system 10 may provide a provisioning performance result (e.g., success, failure, provisioned cloud instance information, etc.) to the client 13 requesting the cloud instance. The provisioning system 10 may store the provisioning performance result in a database.

So far, a provisioning method for a cloud service according to some embodiments of the present disclosure has been schematically described with reference to FIG. 7. Hereinafter, a regular instance provisioning method and a spot instance provisioning method according to some embodiments of the present disclosure will be described with reference to FIGS. 8 to 12.

FIGS. 8 to 12 assume a case, in which the number of cloud nodes is 'one' for convenience of understanding. Therefore, in the description of FIGS. 8 to 12, the total utilization rate of cloud resources may be understood to mean the utilization rate (or total utilization rate) of cloud nodes, and it may be understood that the provisioning method illustrated in FIGS. 8 to 12 is applied for a specific cloud node. For a method of designating a specific cloud node, a method of performing provisioning for a plurality of cloud nodes, and the like, FIGS. 13 to 15 may be referred.

First, a regular instance provisioning method according to some embodiments of the present disclosure will be described with reference to FIGS. 8 and 10.

Figure 8:
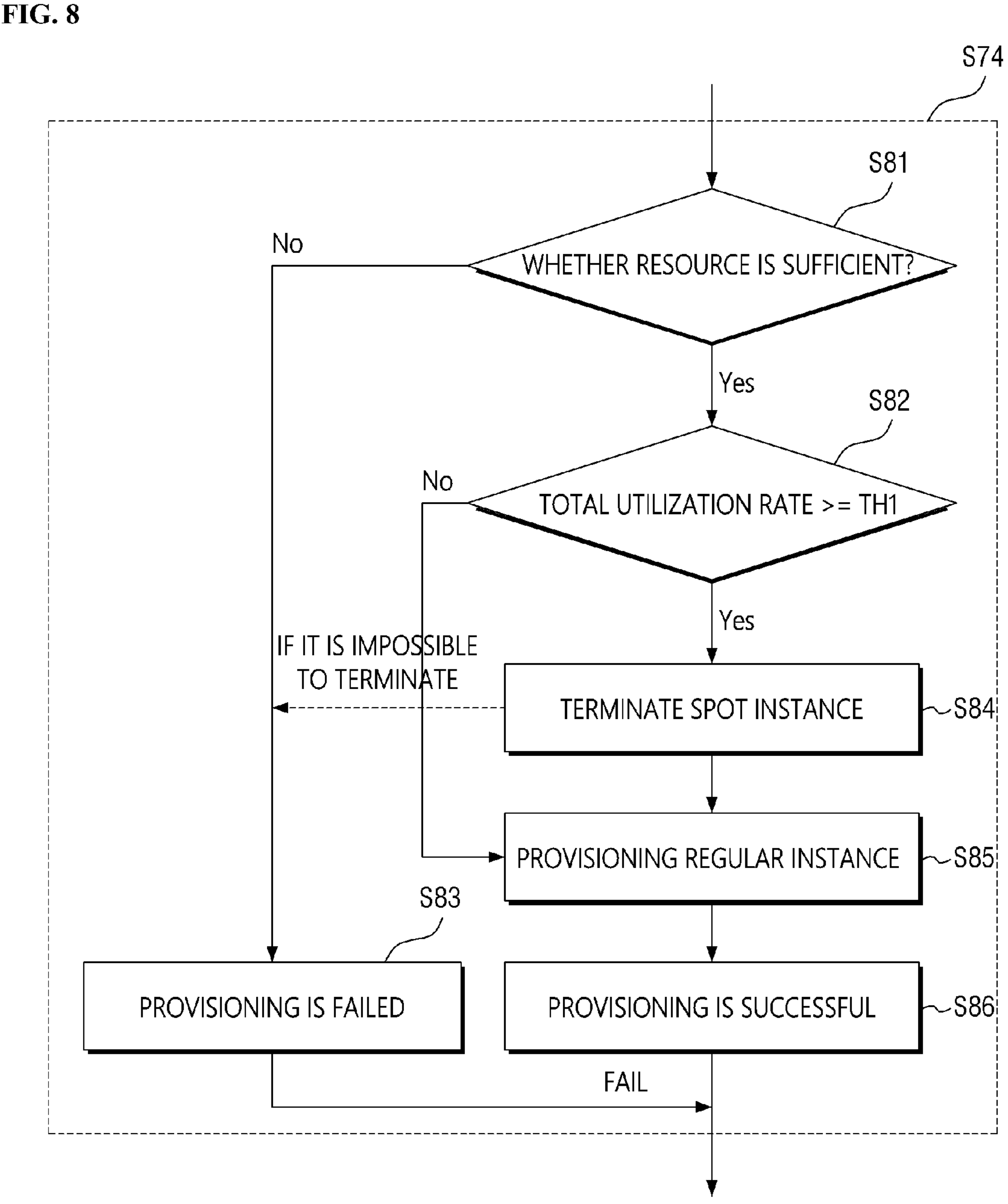
FIG. 8 is an exemplary flow diagram illustrating a regular instance provisioning method (algorithm) according to some embodiments of the present disclosure.

FIG. 8 is an exemplary flow diagram illustrating a regular instance provisioning method according to some embodiments of the present disclosure. However, this is only a preferred embodiment for achieving the object of the present disclosure, and some steps may be added or deleted as needed.

As shown in FIG. 8, the provisioning method according to the embodiments may start at step S81 of determining whether cloud resources are sufficient. If it is determined that the cloud resources are sufficient, step S82 may be performed, and in the opposite case, step S83 may be performed.

For example, the provisioning system 10 may determine whether cloud resources are sufficient based on the number of cloud instances that can be created (provisioned) and/or the number of virtual cloud resources (e.g., virtual processors, virtual memory) that can be allocated. As a more specific example, the provisioning system 10 may determine that cloud resources are sufficient when the number of assignable virtual processors is equal to or greater than a predetermined threshold value and the number of virtual memories is also equal to or greater than a predetermined threshold value. Here, the number of virtual processors (or virtual memories) that can be assigned may be calculated by subtracting the number of previously assigned virtual processors (or virtual memories) from the maximum number of virtual processors (or virtual memories) that can be assigned through all the cloud nodes 12. As described above, the maximum number of assignable virtual processors (or virtual memories) may be a kind of set value (i.e., a settable parameter value). As another example, the provisioning system 10 may compare the total utilization rate of cloud resources with a predetermined threshold value to determine whether the cloud resources are sufficient.

In step S82, it may be determined whether the total utilization rate of cloud resources is equal to or greater than the first threshold value TH1. In response to the determination that the value is equal to or greater than the first threshold, step S84 may be performed, and step S85 may be performed in the opposite case.

Here, the first threshold value may mean a value set to determine whether regular instance provisioning is possible without additional measures (e.g., termination or migration of previously provisioned spot instances). The first threshold value may be set for each type of cloud resource, and may be set to different values or the same value according to the type of cloud resource.

When the first threshold value is set for each type of cloud resource, step S84 may be performed if any one of the total utilization rates of each cloud resource is equal to or greater than the first threshold. For example, suppose that the first threshold value is composed of a processor resource threshold value (hereinafter referred to as a 'first resource threshold value') and a memory resource threshold value (hereinafter referred to as a 'second resource threshold value'). In this case, when the total utilization rate of processor resources is equal to or greater than the first resource threshold value or the total utilization rate of memory resources is equal to or greater than the second resource threshold value, the provisioning system 10 may perform step S84. The first threshold value will be further described later with reference to FIG. 12.

Hereinafter, for convenience of understanding, 'first threshold value,' first processor resource threshold value,' and 'first memory resource threshold value' will continue to be used in the same meaning as described above.

It will be described with reference to FIG. 8 again.

In step S83, it may be determined that provisioning of the requested regular instance is failed.

In step S84, the spot instance may be terminated. Specifically, at least one instance designated as a termination target among pre-provisioned spot instances may be terminated, and a method of designating the termination target may be designed in various ways. Details of this step will be described in detail later with reference to FIGS. 9 and 10.

For reference, if it is impossible to terminate spot instances (e.g., if there is no spot instance to terminate, if the total utilization rate of cloud resources exceeds the first threshold value even if all spot instances are terminated, etc.), it may be determined that provisioning is failed (see S83).

At step S85, the requested regular instance may be provisioned. For example, the provisioning system 10 may create the requested regular instance using the virtual processor and virtual memory provided by the specific cloud node 12.

In step S86, it may be determined that provisioning of the requested regular instance is successful.

So far, a regular instance provisioning method according to some embodiments of the present disclosure has been described with reference to FIG. 8. As described above, by performing provisioning of regular instances based on the total utilization rate of cloud resources (i.e., the resource utilization rate of a specific cloud node), the generation of idle resources may be minimized and the use (operation) efficiency of cloud resources may be greatly improved. In addition, the quality of service of the regular instance may be guaranteed by terminating the spot instance and provisioning the regular instance when the total utilization rate of cloud resources is equal to or greater than the first threshold value.

Hereinafter, a method for terminating a spot instance according to some embodiments of the present disclosure will be described with reference to FIGS. 9 and 10.

Figure 9:
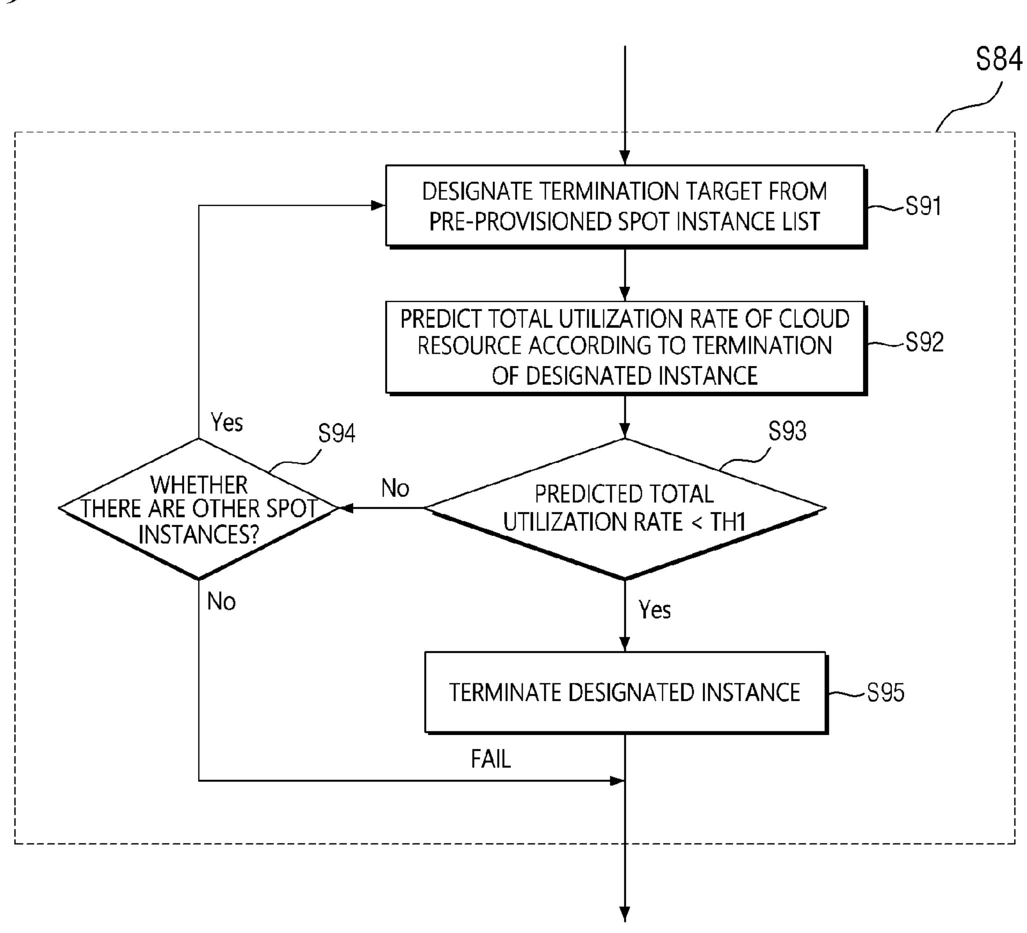
FIGS. 9 and 10 are exemplary diagrams for describing a spot instance termination method according to some embodiments of the present disclosure.

FIG. 9 is an exemplary flowchart illustrating a method for terminating a spot instance according to some embodiments of the present disclosure. However, this is only a preferred embodiment for achieving the object of the present disclosure, and some steps may be added or deleted as needed.

As shown in FIG. 9, the method for terminating a spot instance according to embodiments may start in step S91 of designating a termination target from a pre-provisioned spot instance list. For example, the provisioning system 10 may designate a termination target based on a resource utilization rate of an individual spot instance, a bid price, a usage period, and the like.

As a more specific example, the provisioning system 10 may designate a spot instance having the highest resource utilization rate (e.g., processor resource utilization rate or memory resource utilization rate) as the termination target. Alternatively, the provisioning system 10 may designate a spot instance having the smallest difference between the total predicted utilization rate (refer to the description below) and the first threshold value according to the termination as the termination target.

As another example, the provisioning system 10 may designate a termination target based on a bid price. For example, a spot instance with the lowest bid price may be designated as the termination target. In this case, price competition for spot instances may be induced, and ultimately profitability of cloud service providers may be improved.

As another example, the provisioning system 10 may designate a termination target based on a usage period. For example, a spot instance with the oldest usage period may be designated as a termination target.

As another example, the provisioning system 10 may randomly designate the termination target.

As another example, the termination target may be designated based on various combinations of the above examples. For example, the provisioning system 10 may designate an instance with the highest resource utilization rate among spot instances whose bid price is equal to or less than the standard as the termination target.

In step S92, the total utilization rate of cloud resources according to the termination of the designated instance may be predicted. For example, the provisioning system 10 may predict total utilization rates of processor resources and memory resources according to instance termination. Specifically, the provisioning system 10 may predicts a decrease in the total resource utilization rate due to termination of a designated instance, and reflect the predicted reduction in the total utilization rate of current cloud resources, thereby calculating a predicted value of the total utilization rate according to termination of a designated instance. For example, the provisioning system 10 may predict the total utilization rate of processor resources according to the termination of the designated instance according to Equation 1 below, and may predict the total utilization rate of memory resources according to the termination of the designated instance in a similar manner.

$$\text{E\_AVG\_10m\_pCPU} \triangleq \text{AVG\_10m\_pCPU} - \frac{\text{AVG\_10m\_vCPU}}{CPU\ \text{allocation ratio}} \quad \text{[Equation 1]}$$

In Equation 1, 'E_AVG_10m_pCPU' and 'AVG_10m_pCPU' may mean the total utilization rate of processor resources and the total utilization rate of current processor resources (e.g., assumed to be average values for 10 minutes of unit time) predicted according to instance termination, respectively. In addition, 'AVG_10m_vCPU' may mean the processor resource utilization rate of the designated spot instance, and 'CPU allocation ratio' means the value used to convert the resource utilization rate based on instance (unit) to resource utilization rate based on node (unit). For example, if the E vCPU of one designated spot instance is '64%' and the total number of assignable virtual processors of the corresponding cloud node is '8,' 'CPU allocation ratio' may be '8.' This is because '64%,' the utilization rate of a spot instance, corresponds to '8%' utilization rate based on the corresponding cloud node.

In step S93, it may be determined whether the predicted total utilization rate is less than a first threshold value. For example, the provisioning system 10 may determine whether total utilization rates predicted for both each of the processor resource and the memory resource are less than a first threshold value (i.e., a first processor resource threshold value and a first memory resource threshold value). If it is less than the first threshold value, step S95 may be performed, and in the opposite case, step S94 may be performed (i.e., a termination target is additionally designated).

In step S94, it may be determined whether another spot instance exists in the pre-provisioned spot instance list. If there are other spot instances, steps S91 to S93 described above may be repeatedly performed for other spot instances. In the opposite case, provisioning for the requested regular instance may be determined to fail.

In step S95, one or more spot instances designated as termination targets may be terminated.

Hereinafter, in order to provide more convenience of understanding, a specific example of a method of terminating a spot instance will be further described with reference to FIG. 10.

Figure 10:
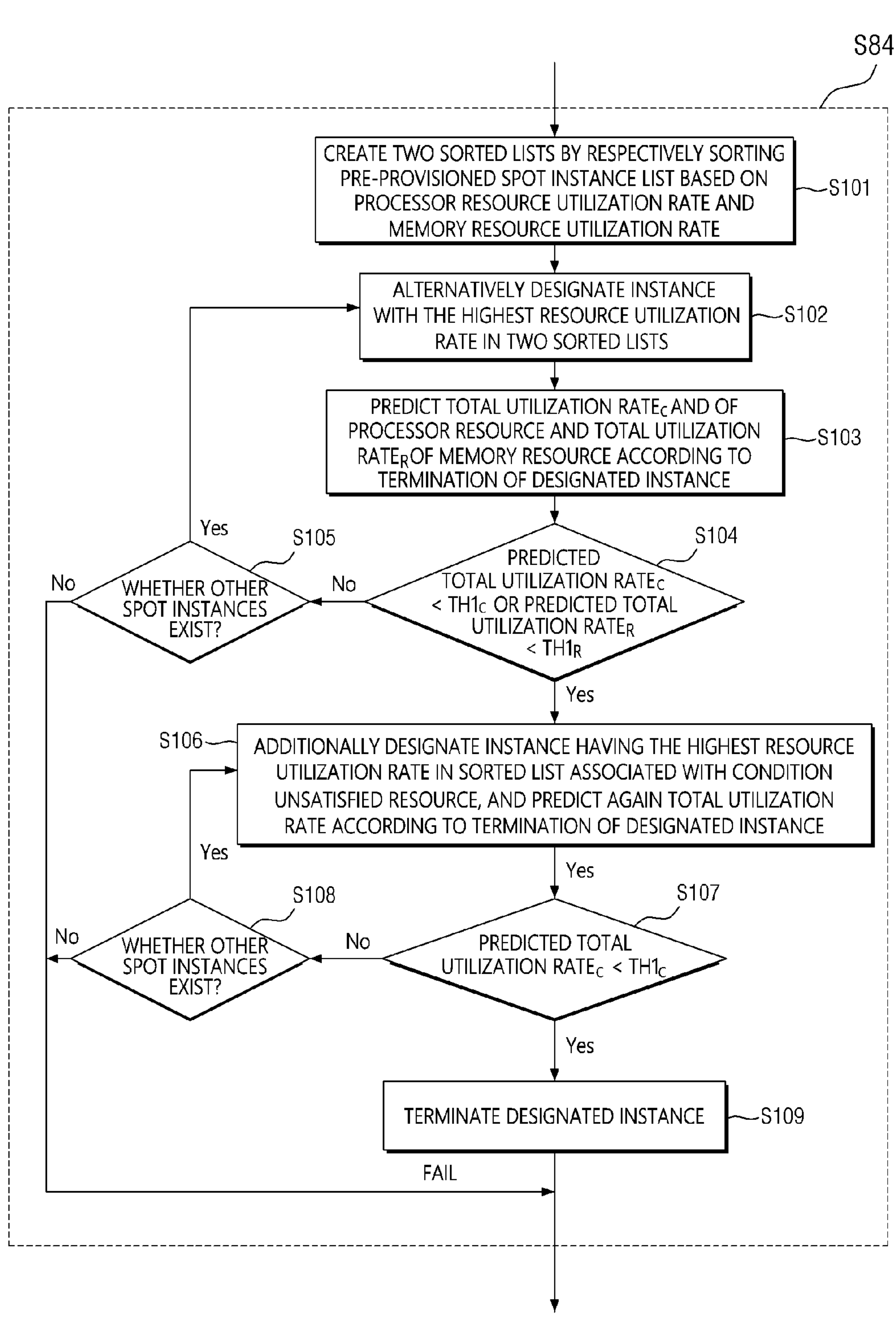

FIG. 10 assumes that a spot instance with the highest resource utilization rate is designated as a termination target, and that the first threshold value is composed of a first processor resource threshold value and a first memory resource threshold value.

As shown in FIG. 10, in step S101, a sorted list may be created by sorting the pre-provisioned spot instance list based on the resource utilization rate of the instance. Specifically, a first sorted list sorted on the basis of processor resource utilization rate and a second sorted list sorted on the basis of memory resource utilization rate may be created.

In step S102, an instance with the highest resource utilization rate (e.g., the first instance in descending order) in the sorted list may be designated as a termination target, and the designated instance may be removed from the sorted list. If this step is repeatedly performed, an instance with the highest resource utilization rate may be alternately designated in the two sorted lists. For example, if a termination target instance has been previously designated in the first sorted list, a termination target may be designated in the second sorted list this time, and a termination target may be designated again in the first sorted list the next time.

In step S103, the total utilization rate of processor resources (utilization rate c, hereinafter referred to as 'first total utilization rate') and the total utilization rate of memory resources (utilization rate R, hereinafter referred to as 'second total utilization rate') according to the termination of the specified instance may be respectively predicted.

In step S104, it may be determined whether the first total utilization rate is less than the first processor resource threshold value $\mathbf{TH1}_C$ or the second total utilization rate is less than the first memory resource threshold value $\mathbf{TH1}_R$. Depending on the determination result, step S105 or step S106 may be performed.

In step S105, it may be determined whether there are other spot instances in the two sorted lists (or the sorted list, in which the next termination target is designated). If it exists, steps S102 and S103 may be repeatedly performed for other spot instances (i.e., termination targets are additionally designated).

In step S106, an instance having the highest resource utilization rate in the sorted list associated with the condition unsatisfied resource may be additionally designated. In addition, the total utilization rate of resources according to the termination of the additionally designated instance may be predicted again. For example, if the above condition is not satisfied because the first total utilization rate is equal to or greater than the first processor resource threshold value, a termination target may be additionally designated in the first sorted list, and the total utilization rate (utilization rate $_C$) of processor resources may be predicted again according to termination of the designated instance.

In step S107, it may be determined again whether the predicted total utilization rate is less than the resource threshold value (e.g., $\mathbf{TH1}_C$). Depending on the determination result, step S107 or step S108 may be performed. FIG. 10 assumes a case, in which the total utilization rate for processor resources is predicted again.

In step S108, it may be determined whether there are other spot instances in the two sorted lists (or the sorted list, in which the termination target is designated the next time). If it exists, steps S106 and S107 may be repeatedly performed for other spot instances (i.e., a termination target is additionally designated).

In step S109, the designated instance may be terminated.

So far, a method for terminating a spot instance according to some embodiments of the present disclosure has been described with reference to FIGS. 9 and 10. As described above, by determining the spot instance to be terminated first according to criteria such as utilization rate, bid price, and/or usage period, termination of the spot instance may be performed in a simple but fair manner. In addition, by predicting the total utilization rate of cloud resources (i.e., resource utilization rate of a specific cloud node) according to the termination of the designated spot instance and terminating the spot instance only until the predicted total utilization rate is less than the first threshold value, the pre-provisioned spot instances may be prevented from being excessively terminated.

Hereinafter, the spot instance provisioning method according to some embodiments of the present disclosure will be described with reference to FIGS. 11 and 12. However, for clarity of the present disclosure, descriptions of overlapping contents with those of the previous embodiments will be omitted.

The provisioning method according to embodiments may be performed in response to receiving a spot instance request from the client 13 or may be performed at the last point of the current time window (see FIG. 5). Hereinafter, description will be continued on the assumption that the present method is performed at the last point of the current time window.

In addition, as described above, the request for spot instances may comprise information such as the usage period of the instance, the required performance, the image to be executed on the instance, the bid price, the amount of processor resources, the amount of memory resources, and the allowable waiting time (i.e., maximum waiting time until provisioned).

Hereinafter, a provisioning method according to embodiments will be described in more detail with reference to an exemplary flowchart illustrated in FIG. 11.

Figure 11:
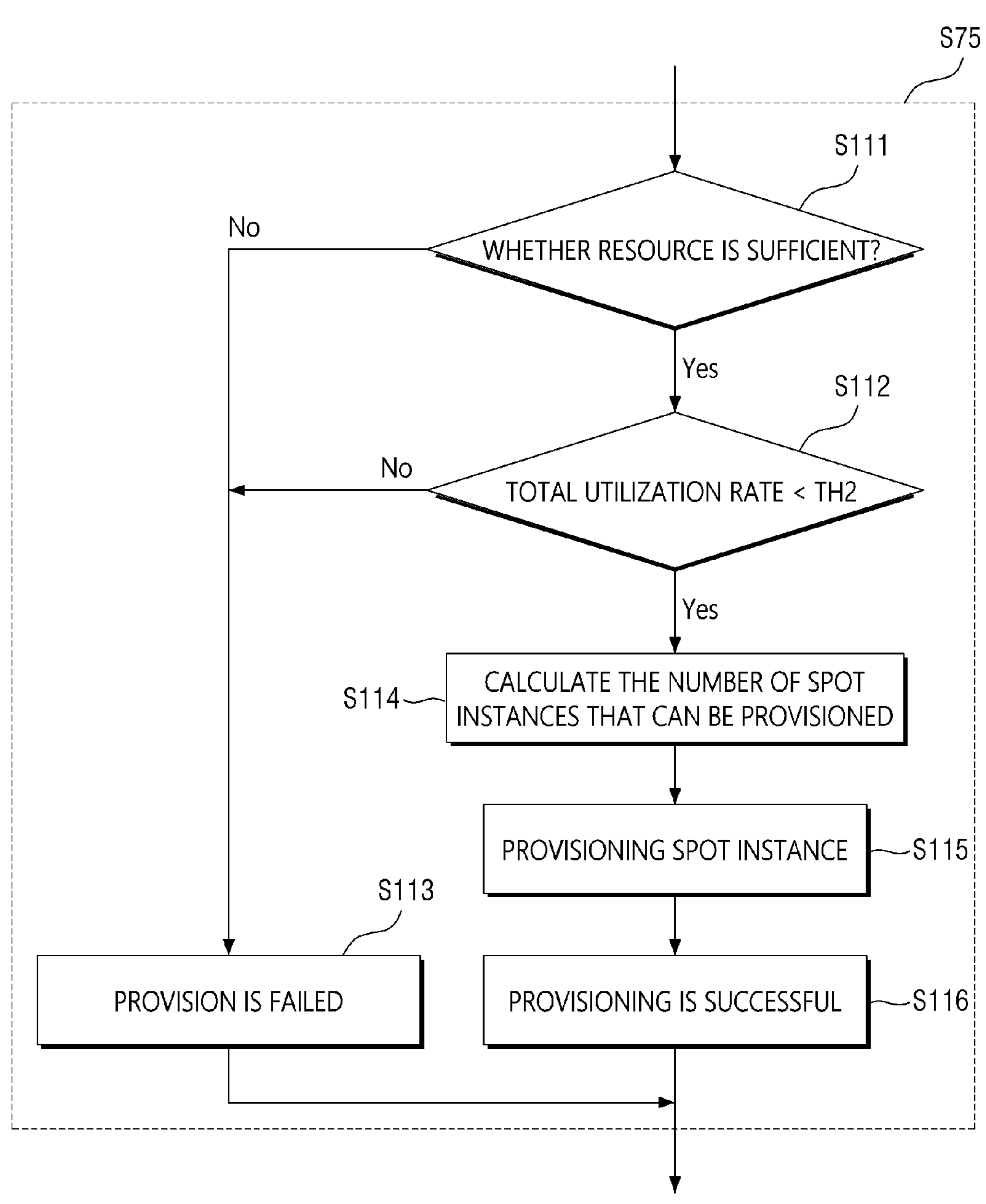
FIG. 11 is an exemplary flow diagram illustrating a spot instance provisioning method (algorithm) according to some embodiments of the present disclosure.

As shown in FIG. 11, the provisioning method according to embodiments may also start in step S111 of determining whether cloud resources are sufficient. If it is determined that the cloud resources are sufficient, step S112 may be performed, and in the opposite case, step S113 may be performed. For a description of this step, further reference may be made to step S81 described above.

In step S112, it may be determined whether the total utilization rate of cloud resources is less than the second threshold value TH2. In response to determining that it is less than the second threshold value, step S114 may be performed, and step S113 may be performed in the opposite case. Here, the second threshold value TH2 is a value set to determine whether a spot instance may be provisioned, and may be set to a value greater than or equal to the first threshold value TH1. For example, the second threshold value TH2 may be set to a value greater than the first threshold value TH1, which may be understood to utilize the characteristics of spot instances (e.g., the usage period is not guaranteed and may be terminated in the middle) to improve the operational efficiency of the cloud resources.

Similar to the first threshold value, the second threshold value may also be set for each type of cloud resource, and may be set to different values or the same value according to the type of cloud resource.

When the second threshold value is set for each type of cloud resource, it may be determined whether all the total utilization rates of each cloud resource are less than the second threshold value. For example, suppose that the second threshold value is composed of a processor resource threshold value (hereinafter referred to as 'second processor resource threshold value') and a memory resource threshold value (hereinafter referred to as 'second memory resource threshold value'). In this case, the provisioning system 10 may determine whether the total utilization rate of processor resources is less than the second processor resource threshold value and the total utilization rate of memory resources is also less than the second memory resource threshold value. Then, the provisioning system 10 may perform step S114 in response to determining that both resources are less than the resource threshold value.

The second threshold value may be a preset fixed value or a value that varies according to circumstances. For example, the second threshold may be a value that varies based on the occurrence frequency of spot instance requests, the occurrence frequency of regular instance requests, and a change in utilization rate of cloud resources. As a more specific example, when the utilization rate of cloud resources changes rapidly or the occurrence frequency of regular instance requests increases rapidly, the provisioning system 10 may set the second threshold value to a smaller value in order to reliably secure resources for regular instances and prevent pre-provisioned spot instances from excessively being terminated. In the opposite case, the provisioning system 10 may set the second threshold value to a larger value. For example, if the occurrence frequency of regular instance requests decreases and the occurrence frequency of spot instance requests increases, the provisioning system 10 may set the second threshold value to a larger value for more active provisioning of spot instances.

Hereinafter, for convenience of understanding, 'second threshold value,' 'second processor resource threshold value,' and 'second memory resource threshold value' will continue to be used in the same meaning as described above.

For more convenience of understanding, the first threshold value and the second threshold value will be further described with reference to FIG. 12.

Figure 12:
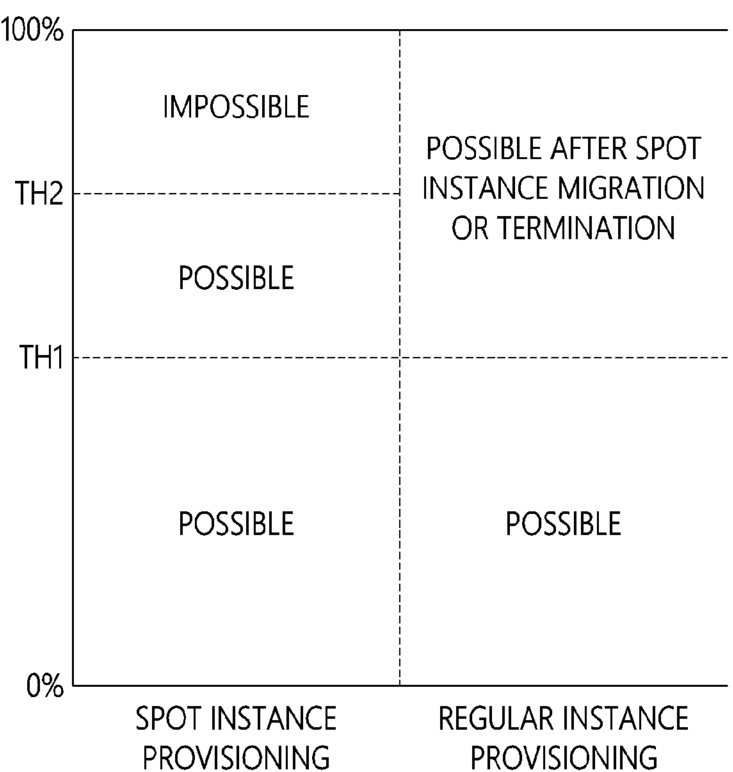
FIG. 12 is an exemplary diagram for further describing two types of threshold values used in provisioning methods according to some embodiments of the present disclosure.

As shown in FIG. 12, the first threshold value TH1 is a value set to determine whether migration or termination measures are required for pre-provisioned spot instances, while the second threshold value TH2 may be a value set to determine whether or not the spot instances may be provisioned. As shown, it may be preferable to set the second threshold value TH2 to a value greater than the first threshold value TH1, which may be understood to utilize the characteristics of the spot instance (e.g., the usage period is not guaranteed and may be terminated in the middle) to improve the efficiency of use of cloud resources.

Meanwhile, the difference between the first threshold value TH1 and the second threshold value TH2 may vary according to circumstances. For example, the difference between the two threshold values may be a value that varies based on the occurrence frequency of spot instance requests, the occurrence frequency of regular instance requests, and a change in utilization rate of cloud resources. As a more specific example, when the utilization rate of cloud resources changes rapidly or the occurrence frequency of regular instance requests increases rapidly, the provisioning system 10 may set the difference between the two threshold values to smaller in order to reliably securing resources for regular instances and prevent pre-provisioned spot instances from excessively being terminated. In the opposite case, the provisioning system 10 may set the difference between the two threshold values to larger. For example, if the occurrence frequency of regular instance requests decreases and the occurrence frequency of spot instance requests increases, the provisioning system 10 may set the difference between the two threshold values to larger for more active provisioning for spot instances.

It will be described with reference to FIG. 11 again.

In step S113, provisioning for the requested spot instance may be determined to fail.

In step S114, the number of spot instances that can be provisioned may be calculated. Specifically, the number of spot instances that can be provisioned may be calculated based on the number of allocatable virtual cloud resources (e.g., virtual processors, virtual memory), the total utilization rate of cloud resources, and/or the first threshold value and the second threshold value. However, a specific calculation method may be designed in various ways.

For example, suppose that the number of assignable virtual processors is $N_{C\text{-}avail}$, the number of assignable virtual memories is $N_{R\text{-}avail}$, and the second processor resource threshold value and the second memory resource threshold are set to '90%,' respectively. In this case, $N_{C\text{-}avail}$ may be calculated by subtracting the number of pre-assigned virtual processors from the maximum number of virtual processors assignable to the specific cloud node 12. In this case, the provisioning system 10 may further calculate the number of assignable virtual processors and virtual memories ($N_C$, $N_R$) according to Equations 2 and 3 below. Also, the provisioning system 10 may determine the minimum value among the calculated $N_{C\text{-}avail}$, $N_{R\text{-}avail}$ $N_C$, and $N_R$ as the number of spot instances that can be provisioned.

$$N_C \triangleq \left\lceil \frac{90 - \text{AVG\_10m\_pCPU}}{\text{E\_vCPU/allocation ratio}} \right\rceil \quad \text{[Equation 2]}$$

$$N_R \triangleq \left\lceil \frac{90 - \text{AVG\_10m\_pRAM}}{\text{E\_vRAM/allocation ratio}} \right\rceil \quad \text{[Equation 3]}$$

In Equations 2 and 3 above, '$N_C$' means the number of assignable virtual processors, '$N_R$' means the number of assignable virtual memories, '90' means the threshold value of each resource, and 'AVG_10m_pCPU' and 'AVG_10m_PRAM' may mean total utilization rates of processor resources and memory resources (e.g., assumed to be average values for 10 minutes of unit time), respectively. In addition, 'E_vCPU' and 'E_vRAM' respectively refer to the predicted resource utilization rate of the spot instance (i.e., the predicted utilization rate for processor resources and the predicted utilization rate for memory resources), and 'allocation ratio' may be understood in the same or similar meaning as the aforementioned 'CPU allocation ratio'. 'E_vCPU' and 'E_vRAM' may be calculated in any way. For example, 'E_vCPU' and 'E_vRAM' may be representative values such as the average of resource utilization rates of pre-provisioned spot instances (i.e., 'E_vCPU' and 'E_vRAM' may be representative utilization rates), a resource utilization rate of any spot instance, or a value obtained from the client 13.

For reference, the numerator formula ('90-AVG_10m_pCPU') in Equation 2 may be understood as obtaining the available ratio (i.e., availability rate) of processor resources in consideration of the resource threshold value, and the denominator formula ('E_vCPU/allocation ratio') may be understood as dividing the utilization rate based on the spot instance by the 'allocation ratio' to convert it into the utilization rate based on the entire resource. For example, if E_vCPU (i.e., the processor resource utilization rate of the spot instance) is 64% and the 'allocation ratio' is '16' (e.g., in case that the maximum of 16 virtual processors may be allocated to all cloud nodes, and there is only one virtual processor allocated to the spot instance), the utilization rate of the corresponding spot instance based on the total resource will be only '4%,' so it may be understood as dividing by 'allocation ratio.'

In step S115, the requested spot instance may be provisioned. Specifically, when the number calculated in the previous step S114 is N, N spot instances may be provisioned. Also, if the requested number of spot instances exceeds N, N spot instances with relatively high bid prices may be provisioned.

In step S116, provisioning for the requested spot instance may be determined to be successful.

So far, the spot instance provisioning method according to some embodiments of the present disclosure has been described with reference to FIGS. 11 and 12. As described above, the use (operation) efficiency of cloud resources may be improved by providing cloud services using spot instances. In addition, when the total utilization rate of cloud resources (i.e., the utilization rate of a specific cloud node) is equal to or greater than the second threshold value, provisioning for spot instances is prohibited, thereby minimizing the impact of spot instances on the performance of regular instances. And thus, the service quality of regular instances may be reliably guaranteed. Furthermore, by accurately calculating the number of spot instances that may be provisioned, the efficiency of using the cloud service may be further improved, and the profitability of the cloud service provider may be improved by provisioning a plurality of spot instances using a price bidding method.

Figure 13:
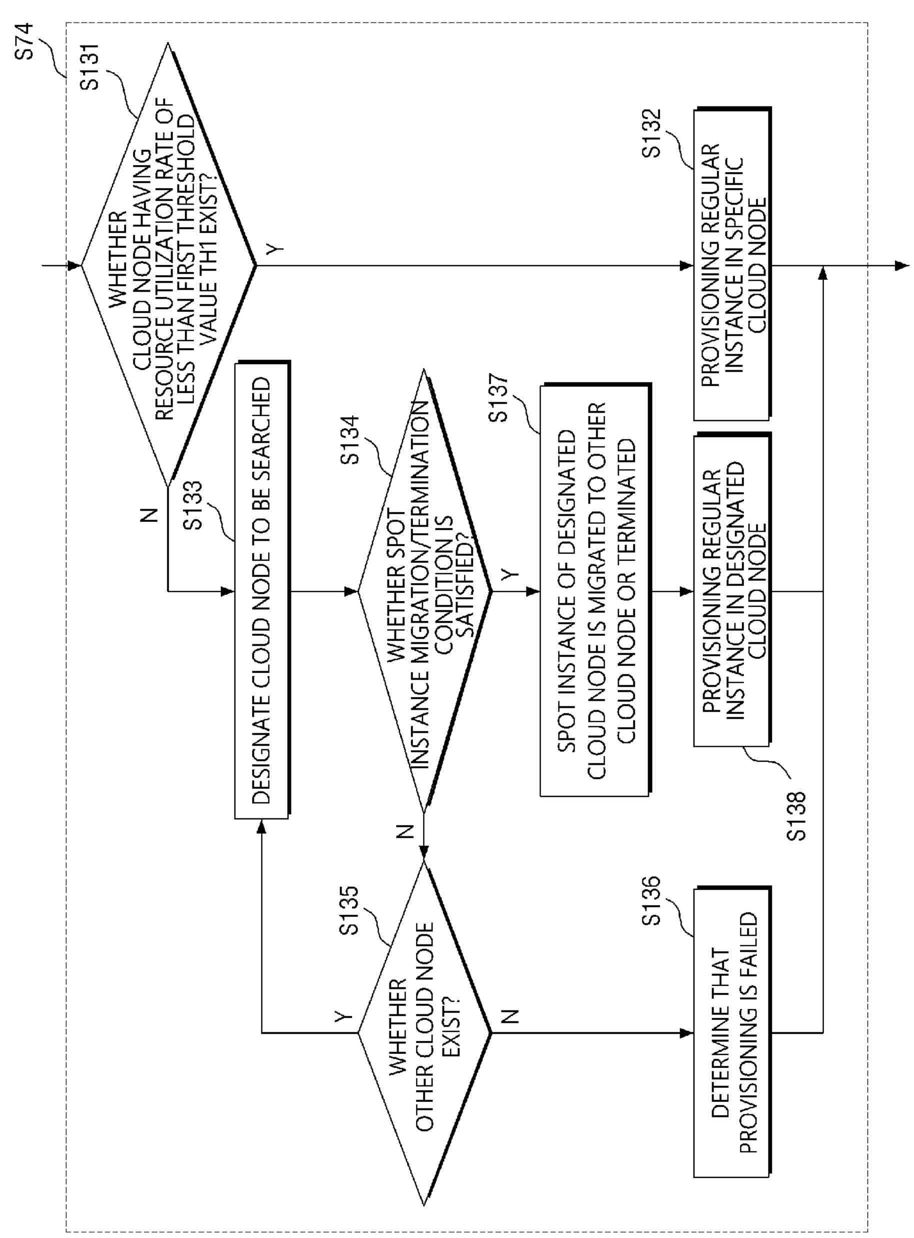
FIG. 13 is an exemplary flowchart illustrating a regular instance provisioning method (algorithm) according to some other embodiments of the present disclosure.
Figure 14:
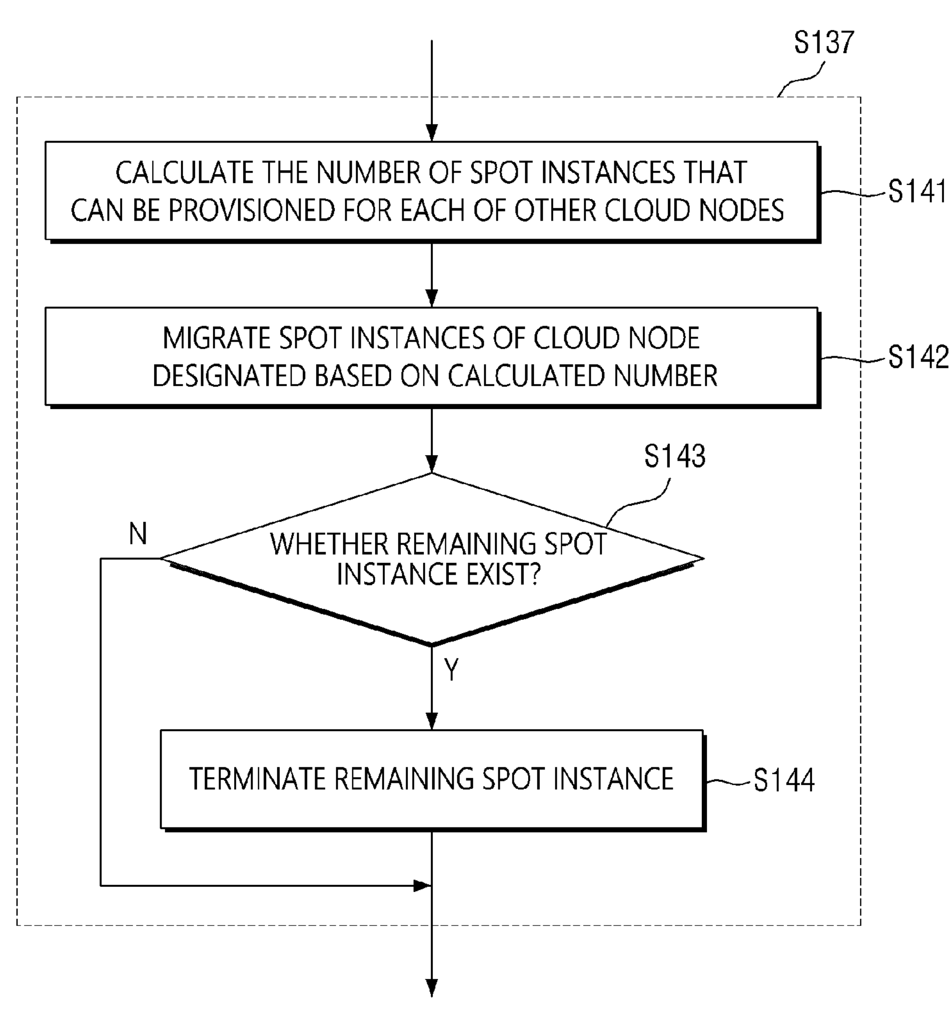
FIG. 14 is an exemplary flowchart illustrating a spot instance termination/migration method according to some other embodiments of the present disclosure.
Figure 15:
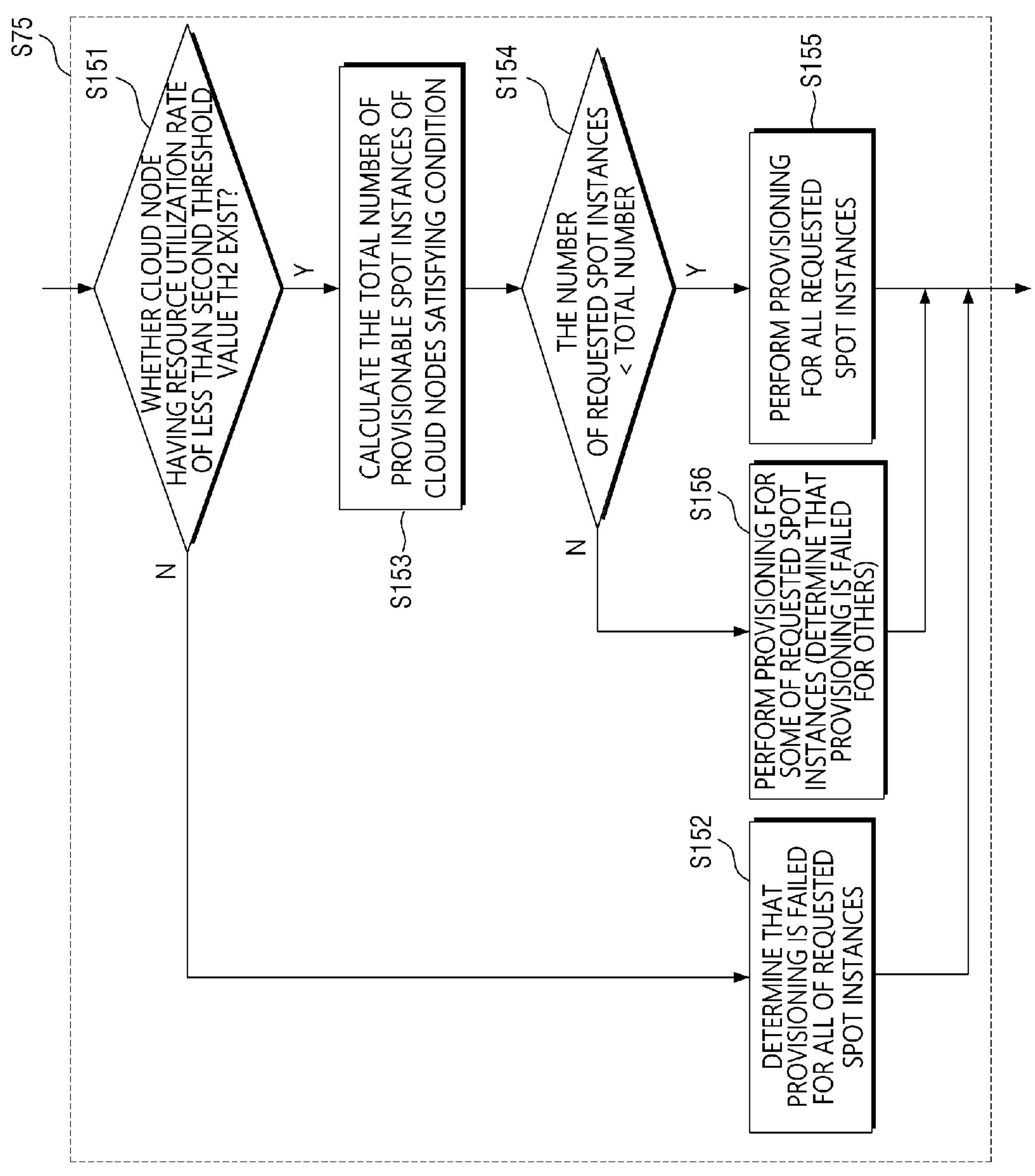
FIG. 15 is an exemplary flowchart illustrating a spot instance provisioning method (algorithm) according to some other embodiments of the present disclosure.

Hereinafter, a regular instance provisioning method and a spot instance provisioning method according to some other embodiments of the present disclosure will be described in detail with reference to FIGS. 13 to 15. FIGS. 13 to 15 assume a case, in which the number of cloud nodes is plural.

First, a regular instance provisioning method (algorithm) according to some other embodiments of the present disclosure will be described with reference to FIGS. 13 and 14.

FIG. 13 is an exemplary flowchart illustrating a regular instance provisioning method according to some other embodiments of the present disclosure. However, this is only a preferred embodiment for achieving the object of the present disclosure, and some steps may be added or deleted as needed.

As shown in FIG. 13, in the regular instance provisioning method according to embodiments, it may start in step S131 of determining whether or not a cloud node having a resource utilization rate of less than a first threshold value TH1 among a plurality of cloud nodes (i.e., a cloud node that satisfies the condition of being less than the first threshold value) exists. Depending on the determination result, step S132 or step S133 may be performed. That is, as a result of the determination, if a cloud node satisfying the above condition exists, step S132 may be performed, and if there is no cloud node satisfying the above condition, step S133 may be performed.

As described above, the first threshold value may mean a value set to determine whether regular instance provisioning is possible without additional measures (i.e., spot instance migration and/or termination measures), and may be set for each type of cloud resource.

If a first threshold value is set for each type of cloud resource, the provisioning system 10 may determine whether a cloud node having utilization rates of all cloud resources less than the first threshold value exists. As a more specific example, suppose that the first threshold value is composed of a first processor resource threshold value and a first memory resource threshold value. In this case, the provisioning system 10 may determine whether there is a cloud node, in which utilization rates of processor resources and memory resources are less than the first processor resource threshold value and the first memory resource threshold value, respectively.

In step S132, a regular instance may be provisioned in a specific cloud node among cloud nodes that satisfy the above conditions. For example, the provisioning system 10 may create a regular instance using virtual processor resources and virtual memory resources of a specific cloud node and provide a provisioning result (e.g., success, information about the created regular instance) to the client 13.

Here, the specific cloud node may be, for example, a cloud node with the lowest resource utilization rate (e.g., a cloud node with the smallest sum, maximum value, average value, etc. of processor resource utilization rate and memory resource utilization rate), a specific node selected among cloud nodes with resource utilization rate below the threshold value, etc. However, the scope of the present disclosure is not limited thereto.

Steps S133 to S135 to be described below may be understood as a search process for finding a provisionable cloud node. Hereinafter, each step will be described.

In step S133, a cloud node to be searched for among a plurality of cloud nodes (i.e., a current search node) may be designated. For example, the provisioning system 10 may sort a plurality of cloud nodes in ascending order based on resource utilization rate (e.g., sorting based on the sum, maximum value, average value, etc. of processor resource utilization rate and memory resource utilization rate), and designate the cloud node to be searched according to the sorted order.

In step S134, it may be determined whether the designated cloud node satisfies a preset spot instance migration/termination condition. Here, the spot instance migration/termination condition may refer to a condition, in which the resource utilization rate of a corresponding cloud node becomes less than a first threshold value as at least some of the spot instances (i.e., pre-provisioned spot instances) are migrated or terminated. Depending on the determination result, step S135 or step S137 may be performed.

In step S135, it may be determined whether there is other cloud nodes to be searched for. If other cloud nodes exist, the above-described steps S133 and S134 may be repeatedly performed for the corresponding cloud node. That is, the provisioning system 10 may determine whether other cloud nodes satisfy the above migration/termination condition. In the opposite case, provisioning may be determined to fail (S136).

In step S137, the spot instance of the designated cloud node may be migrated to the other cloud node or may be terminated. However, the specific method may vary depending on the embodiment.

In some embodiments, the provisioning system 10 may terminate the spot instance of the designated cloud node without performing the migration. For example, the provisioning system 10 may terminate all spot instances of a designated cloud node or may terminate the spot instances only until the resource utilization rate of the designated cloud node becomes less than a first threshold value (see the descriptions of FIGS. 9 and 10). According to these embodiments, the cost required for migration may be reduced and the complexity of the provisioning algorithm may be reduced.

In some other embodiments, the provisioning system 10 may preferentially perform migration to spot instances. According to these embodiments, satisfaction of clients using spot instances may be improved as the termination frequency of spot instances decreases. In order to provide more convenience of understanding, a further description will be made with reference to FIG. 14.

As shown in FIG. 14, in step S141, the number of spot instances that can be provisioned for each of the other cloud nodes (i.e., nodes other than the designated cloud node) (hereinafter, abbreviated as 'provisionable number') may be calculated. This step may be understood as a step of determining a target cloud node for migration based on the provisionable number. In the following description, the node, to which the spot instance is transferred, may be referred to as a 'target cloud node,' and the node which transfers the spot instance to the target cloud node (i.e., a designated cloud node) may be referred to as a 'source cloud node.'

For example, the provisioning system 10 may calculate the provisionable number for each cloud node. In some cases, the provisioning system 10 may calculate the provisionable number only for cloud nodes whose resource utilization rate is less than a reference value (e.g., a first threshold value). A method for calculating the provisionable number will be described later (see step S153 to be described later).

In step S142, spot instances of a cloud node (i.e., a source cloud node) designated based on the provisionable number may be migrated to a target cloud node (e.g., a node having the provisionable number of 1 or more). However, the specific method may be designed in various ways.

For example, the provisioning system 10 may first migrate a spot instance to a target cloud node having a large provisionable number (or a low resource utilization rate). At this time, the provisioning system 10 may or may not migrate spot instances as many as the provisionable number of the corresponding target cloud node.

As another example, the provisioning system 10 may migrate the number of spot instances corresponding to the same ratio to at least one target cloud node. As a more specific example, it is assumed that the provisionable numbers of each of the first cloud node and the second cloud node are '6' and '4' and a preset ratio is '50%.' In this case, the provisioning system 10 may migrate three (6*50%=3) spot instances to the first cloud node and migrate two (4*50%=2) spot instances to the second cloud node.

As another example, the provisioning system 10 may migrate the same number of spot instances to at least one target cloud node. As a more specific example, the provisioning system 10 may migrate two spot instances to a first cloud node and also migrate two spot instances to a second cloud node.

As another example, the provisioning system 10 may migrate all spot instances of a source cloud node to target cloud nodes within the total provisionable number of all target cloud nodes (i.e., the total number of spot instances that can be provisioned).

As another example, the provisioning system 10 may migrate the spot instance to the target cloud node only until the resource utilization rate of the source cloud node is less than the first threshold value.

As another example, the provisioning system 10 may first migrate a spot instance having a high resource utilization rate (e.g., a sum, a maximum value, an average value, etc. of processor resource and memory resource utilization rates) (i. e., migrate in higher order).

As another example, the provisioning system 10 may first migrate a spot instance with a high price.

As another example, the provisioning system 10 may first migrate a spot instance with short used period.

As another example, a spot instance of a source cloud node may be migrated to a target cloud node based on various combinations of the above examples. For example, the provisioning system 10 may migrate spot instances in high price order (i.e., descending order) until the resource utilization rate of the source cloud node becomes less than the first threshold value.

In step S143, it may be determined whether remaining spot instances exist in the source cloud node. If they exist, step S144 may be performed.

In step S144, the remaining spot instances may be terminated (i.e., terminated before the requested regular instances are provisioned). However, the specific method may be designed in various ways.

For example, the provisioning system 10 may terminate all remaining spot instances.

As another example, the provisioning system 10 may terminate the remaining spot instances only until the resource utilization rate of the source cloud node becomes less than the first threshold value.

As another example, the provisioning system 10 may first terminate a spot instance having a high resource utilization rate (e.g., a sum, a maximum value, an average value, etc. of processor resource and memory resource utilization rates) among the remaining spot instances.

As another example, the provisioning system 10 may first terminate a spot instance with a low price among the remaining spot instances.

As another example, the provisioning system 10 may first terminate a spot instance having long used period among the remaining spot instances.

As another example, the remaining spot instances may be terminated based on various combinations of the above examples. For example, the provisioning system 10 may terminate the remaining spot instances in low price order (i.e., in ascending order) until the resource utilization rate of the source cloud node becomes less than the first threshold value.

It will be described with reference to FIG. 13 again.

In step S138, the requested regular instance may be provisioned in the designated cloud node. For example, the provisioning system 10 may create a regular instance using virtual processor resources and virtual memory resources of a designated cloud node and provide a provisioning result (e.g., success, information on the created regular instance) to the client 13.

So far, the regular instance provisioning method according to some other embodiments of the present disclosure has been described with reference to FIGS. 13 and 14. As described above, provisioning of the requested regular instance may be performed based on the resource utilization rate of the cloud node. In this case, since generation of idle resources is minimized, efficiency of use (operation) of cloud resources and profitability of cloud service providers may be greatly improved. In addition, by migrating (or terminating) spot instances and provisioning requested regular instances under certain conditions, the service quality of regular instances may be guaranteed and the provisioning success probability may be increased.

Hereinafter, a spot instance provisioning method (algorithm) according to some other embodiments of the present disclosure will be described with reference to FIG. 15.

The spot instance provisioning method, which will be described later, may be performed immediately in response to a spot instance request from the client 13 or may be performed at the last point of the current time window (see FIG. 5). Hereinafter, description will be continued on the assumption that the present method is performed at the last point of the current time window.

FIG. 15 is an exemplary flowchart illustrating a spot instance provisioning method according to some other embodiments of the present disclosure. However, this is only a preferred embodiment for achieving the object of the present disclosure, and some steps may be added or deleted as needed.

As shown in FIG. 15, in the spot instance provisioning method according to embodiments, it may start in step S151 of determining whether or not a cloud node having a resource utilization rate of less than a second threshold value TH2 (i.e., a cloud node that satisfies the condition of being less than the second threshold value) exists among a plurality of cloud nodes. Depending on the determination result, step S152 or step S153 may be performed. That is, as a result of the determination, if a cloud node satisfying the above condition exists, step S153 may be performed, and if there is no cloud node satisfying the above condition, step S152 may be performed.

In step S152, it may be determined that provisioning has failed for all of the requested spot instances.

In step S153, the total provisionable number of cloud nodes satisfying the above condition may be calculated. For example, the provisioning system 10 may calculate the total provisionable number by calculating the provisionable number for each cloud node and summing up the calculation results. In some cases, the provisioning system 10 may calculate the provisionable number only for cloud nodes whose resource utilization rate is less than a reference value (e.g., a first threshold value, a value between the first threshold value and the second threshold value, etc.). Hereinafter, a method of calculating the provisionable number of individual cloud nodes will be described.

The provisioning system 10 may calculate the provisionable number of the corresponding cloud node based on a resource availability rate of a cloud node (i.e., an available ratio of a resource related to a spot instance) and a representative resource utilization rate of a spot instance. For example, the provisioning system 10 may calculate the provisionable number of the corresponding cloud nodes through a division operation between a resource availability rate and a representative utilization rate. Here, the resource availability rate may be calculated as a value obtained by excluding (subtracting) the resource utilization rate of the corresponding cloud node from the second threshold value, and the representative resource utilization rate of the spot instance may be calculated based on the utilization rate of spot instances operating (executing) on the corresponding cloud node (i.e., pre-provisioned spot instances) (e.g., the representative utilization rate may be an average value, a mode value, a median value, etc.).

When the cloud resource is composed of a processor resource and a memory resource, the above-described calculation process may be performed in the same manner for each of the different types of cloud resources. In order to provide more convenience of understanding, an example will be described.

For example, suppose that the second processor resource threshold value and the second memory resource threshold value are each set to '90%.' In this case, the provisioning system 10 may calculate the number of assignable virtual processors '$N_C$' and the number of assignable virtual memories '$N_R$' according to Equations 2 and 3 described above.

And, the provisioning system 10 may calculate the minimum value of '$N_C$' and '$N_R$' as the provisionable number.

As described above, in Equations 2 and 3, '90' means the second processor/memory resource threshold value, and 'AVG_10m_pCPU' and 'AVG_10m_PRAM' may refer to the processor resource utilization rate and memory resource utilization rate (e.g., utilization rate measured as an average value for 10 minutes of unit time) of the corresponding cloud node, respectively. In addition, 'E_vCPU' and 'E_vRAM' may mean, for example, the representative processor utilization rate and the representative memory utilization rate of the spot instance. As described above, the 'allocation ratio' may refer to a value used to convert the instance-based (unit) resource utilization rate into the node-based (unit) resource utilization rate. For example, it is assumed that the E_vCPU (i.e., representative processor utilization rate based on the instance) for the pre-allocated '2' spot instances is '64%' and the total number of virtual processors that can be assigned to the cloud node is '16.' In this case, the 'allocation ratio' may be '8.' This is because when two spot instances are in operation, the representative utilization rate of '64%' corresponds to the utilization rate of '8%' based on the cloud node.

It will be described with reference to FIG. 15 again.

In step S154, the number of requested spot instances and the total provisionable number may be compared. As a result of the comparison, if the number of requested spot instances is smaller, step S155 may be performed. In the opposite case, step S156 may be performed.

In step S155, provisioning may be successfully performed for all requested spot instances. For example, the provisioning system 10 may provision the requested spot instances based on the provisionable number of each cloud node. However, the specific method may be designed in various ways.

For example, the provisioning system 10 may first provision a requested spot instance in a cloud node having a large provisionable number (or a low resource utilization rate). At this time, the provisioning system 10 may or may not provision the requested spot instances as many as the provisionable number of corresponding cloud nodes.

As another example, the provisioning system 10 may provision the number of spot instances corresponding to the same ratio in at least one cloud node. As a more specific example, suppose that the provisionable numbers of each of the first cloud node and the second cloud node are '6' and '4' and a preset ratio is '50%.' In this case, the provisioning system 10 may provision three (6*50%=3) spot instances on the first cloud node and two (4*50%=2) spot instances on the second cloud node.

As another example, the provisioning system 10 may provision the same number of spot instances in at least one cloud node. As a more specific example, the provisioning system 10 may provision two spot instances in a first cloud node and also provision two spot instances in a second cloud node.

As another example, the requested spot instances may be provisioned based on various combinations of the above examples.

In step S156, provisioning may be performed for only some of the requested spot instances. For example, if the total provisionable number is 'N' and the number of requested spot instances is 'K' (however, K>N), the provisioning system 10 may provision 'N' spot instances from among the requested 'K' spot instances, and determine that provisioning has failed for the remaining 'K-N' spot instances. At this time, the provisioning system 10 may determine the 'N' number of spot instances to be provisioned based on the price of the requested spot instance (i.e., the top 'N' number of spot instances with higher prices are provisioned).

So far, the spot instance provisioning method according to some other embodiments of the present disclosure has been described with reference to FIG. 15. As described above, by providing cloud services using spot instances in addition to regular instances, operational efficiency of cloud resources may be improved. In addition, when the resource utilization rate of the cloud node is equal to or greater than the second threshold, provisioning of the spot instance may be prohibited, thereby minimizing the impact of the spot instance on the performance of the regular instance. Furthermore, profitability of a cloud service provider may be greatly improved by provisioning a plurality of spot instances in a price bidding method.

Hereinafter, an exemplary computing device 160 capable of implementing the provisioning system 10 described above will be described with reference to FIG. 16.

FIG. 16 is an exemplary hardware configuration diagram illustrating computing device 160.

As shown in FIG. 16, the computing device 160 may include one or more processors 161, a bus 163, a communication interface 164, a memory 162 for loading a computer program executed by the processor 161 and a storage 165 for storing the computer program 166. However, only components related to the embodiment of the present disclosure are shown in FIG. 16. Accordingly, those skilled in the art to which the present disclosure pertains would understand that other general-purpose components may be further included in addition to the components shown in FIG. 16. That is, the computing device 160 may further include various components other than the components shown in FIG. 16. Also, in some cases, the computing device 160 may be configured in a form, in which some of the components shown in FIG. 16 are omitted. Hereinafter, each component of the computing device 160 will be described.

The processor 161 may control overall operations of each component of the computing device 160. The processor 161 may include at least one of a Central Processing Unit (CPU), a Micro Processor Unit (MPU), a Micro Controller Unit (MCU), a Graphic Processing Unit (GPU), or any type of processor well known in the art. Also, the processor 161 may perform an operation for at least one application or program for executing an operation/method according to embodiments of the present disclosure. The computing device 160 may include one or more processors.

Next, the memory 162 may store various data, commands and/or information. The memory 162 may load computer program 166 from storage 165 to execute operations/methods according to embodiments of the present disclosure. The memory 162 may be implemented as a volatile memory such as RAM, but the technical scope of the present disclosure is not limited thereto.

Next, the bus 163 may provide a communication function between components of the computing device 160. The bus 163 may be implemented as various types of buses such as an address bus, a data bus, and a control bus.

Next, the communication interface 164 may support wired/wireless Internet communication of the computing device 160. Also, the communication interface 164 may support various communication methods other than internet communication. To this end, the communication interface 164 may include a communication module well known in the art of the present disclosure.

Next, storage 165 may non-temporarily store one or more computer programs 166. The storage 165 may include a non-volatile memory such as read only memory (ROM), erasable programmable ROM (EPROM), electrically erasable programmable ROM (EEPROM), flash memory, etc., a hard disk, a removable disk, or any known type of computer-readable recording medium well known in the art.

In turn, computer program 166 may include one or more instructions that when loaded into memory 162 cause processor 161 to perform operations/methods in accordance with various embodiments of the present disclosure. That is, the processor 161 may perform operations/methods according to various embodiments of the present disclosure by executing one or more loaded instructions.

For example, the computer program 166 may include instructions for perform an operation of collecting a resource utilization rate of each of a plurality of cloud nodes, an operation of receiving a regular instance request from a client, an operation of determining whether there is a cloud node among the plurality of cloud nodes that satisfies a first condition, in which a resource utilization rate collected is less than a first threshold value, an operation of designating a specific cloud node among a plurality of cloud nodes based on a determination that there is no cloud node that satisfies the first condition, and an operation of terminating at least some of the spot instances pre-provisioned on the specific cloud node and provisioning the requested regular instances. In this case, the provisioning system 10 according to some embodiments of the present disclosure may be implemented through the computing device 160.

As another example, the computer program 166 may include instructions for performing an operation of collecting a resource utilization rate of each of a plurality of cloud nodes, an operation of receiving a regular instance request from at least one client, an operation of determining whether there is a cloud node among the plurality of cloud nodes that satisfies a first condition, in which a resource utilization rate collected is less than a first threshold value, an operation of determining a source cloud node from among a plurality of cloud nodes based on a determination that there is no cloud node that satisfies the first condition, and an operation of migrating at least some of the spot instances of the source cloud node to a target cloud node and an operation of provisioning a requested regular instance in the source cloud node. Even in this case, the provisioning system 10 according to some embodiments of the present disclosure may be implemented through the computing device 160.

As another example, the computer program 166 may include instructions for implementing the method described with reference to FIGS. 7-15. Even in this case, the provisioning system 10 according to some embodiments of the present disclosure may be implemented through the computing device 160.

An exemplary computing device 160 capable of implementing provisioning system 10 according to some embodiments of the present disclosure has been described with reference to FIG. 16.

So far, various embodiments of the present disclosure and effects according to the embodiments have been described with reference to FIGS. 1 to 16. Effects according to the technical spirit of the present disclosure are not limited to the effects mentioned above, and other effects not mentioned will be clearly understood by those skilled in the art from the description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

According to some embodiments of the present disclosure, provisioning of a cloud instance may be performed based on a utilization rate of a cloud resource. In this case, the generation of idle resources is minimized, and the efficiency of use (operation) of cloud resources may be greatly improved.

In addition, by performing provisioning by reflecting the characteristics of regular instances and spot instances, the quality of cloud services may be guaranteed and the efficiency of use of cloud resources may be further improved. For example, when the total utilization rate of cloud resources is equal to or greater than the first threshold value, the regular instance is provisioned after spot instances are migrated or terminated, thereby ensuring the service quality of the regular instance and increasing the provisioning success probability. In addition, when the total utilization rate of cloud resources is less than the second threshold value (however, the second threshold value is usually greater than the first threshold value), provisioning of spot instances is allowed, so that the efficiency of use of cloud resources may be further improved. Furthermore, when the total utilization rate of cloud resources is equal to or greater than the second threshold value, provisioning of spot instances is prohibited, thereby preventing the spot instances from negatively affecting the performance of regular instances.

In addition, by performing provisioning of a plurality of spot instances in a price bidding method, profitability of a cloud service provider may be greatly improved.

In addition, by monitoring the resource utilization rate of the cloud node and the resource utilization rate of the cloud instance through the node agent and the instance agent, the utilization rate of the cloud resource may be accurately and precisely monitored.

In addition, by predicting the cloud resource utilization rate according to the termination of the designated spot instance and terminating the spot instance only until the predicted utilization rate is less than the first threshold value, it is possible to prevent the pre-provisioned spot instances from being excessively terminated.

In addition, by determining the spot instance to be terminated first according to criteria such as utilization rate, bid price, and/or usage period, termination of the spot instance may be performed in a simple but fair manner.

Effects according to the technical spirit of the present disclosure are not limited to the effects mentioned above, and other effects not mentioned will be clearly understood by those skilled in the art from the description above.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A provisioning method performed by at least one computing device for a cloud service, the provisioning method comprising:

collecting resource utilization rates of individual cloud nodes of a plurality of cloud nodes, wherein a resource utilization rate of an individual cloud node includes a resource utilization rate for at least one of a processor or a memory of the individual cloud node;

receiving a regular instance request from at least one client;

determining whether there is a cloud node among the plurality of cloud nodes that satisfies a first condition, in which the collected resource utilization rate is less than a first threshold value;

designating a specific cloud node from among the plurality of cloud nodes based on a determination that there is no cloud node among the plurality of cloud nodes that satisfies the first condition;

terminating at least some of spot instances pre-provisioned and operating on the specific cloud node and provisioning a requested regular instance in the specific cloud node;

receiving, from the at least one client, a plurality of spot instance requests within a current time window;

determining at least one cloud node among the plurality of cloud nodes that satisfies a second condition, in which the collected resource utilization rate is less than a second threshold value; and performing, at a last point of the current time window, provisioning for requested plurality of spot instances based on a resource utilization rate of the determined at least one cloud node.

2. The provisioning method of claim 1, wherein the collecting the resource utilization rate comprises:

collecting a resource utilization rate of the specific cloud node through a node agent operating on the specific cloud node; and collecting a resource utilization rate of a specific cloud instance through an instance agent operating on the specific cloud instance of the specific cloud node.

3. The provisioning method of claim 1, wherein the provisioning the requested regular instance comprises:

designating a termination target from a list of the pre-provisioned spot instances;

predicting a resource utilization rate of the specific cloud node according to termination of designated spot instance; and terminating the designated spot instance based on a determination that the predicted resource utilization rate is less than the first threshold value.

4. The provisioning method of claim 3, wherein the termination target is designated based on a resource utilization rate of a spot instance.

5. The provisioning method of claim 3, wherein the termination target is designated based on at least one of a bid price or a used period of a spot instance.

6. The provisioning method of claim 3, wherein the provisioning the requested regular instance further comprises:

further designating another termination target from the list of the pre-provisioned spot instances based on a determination that the predicted resource utilization rate is equal to or greater than the first threshold value.

7. The provisioning method of claim 1, wherein the second threshold value is set to a value greater than the first threshold value.

8. The provisioning method of claim 1, wherein the performing the provisioning for the requested plurality of spot instances comprises:

excluding, from a provisioning target, an instance that exceeds an allowable waiting time of a corresponding client among the requested plurality of spot instances.

9. The provisioning method of claim 1, wherein the performing the provisioning for the requested plurality of spot instances comprises:

determining at least one spot instance among the requested plurality of spot instances based on a bid price; and provisioning the at least one determined spot instance.

10. The provisioning method of claim 1, wherein the performing the provisioning for the requested plurality of spot instances comprises:

calculating a total number of spot instances that can be provisioned in the determined at least one cloud node based on a the resource utilization rate of the determined at least one cloud node; and provisioning the calculated total number of spot instances among the requested plurality of spot instances.

11. The provisioning method of claim 10, wherein the calculating the total number of spot instances that can be provisioned comprises:

calculating a resource availability rate of a first cloud node, among the determined at least one cloud node, based on a resource utilization rate of the first cloud node and the second threshold value;

calculating a representative resource utilization rate for a spot instance based on a resource utilization rate of a spot instance operating in the first cloud node; and calculating a number of spot instances that can be provisioned in the first cloud node based on the resource availability rate and the representative resource utilization rate.

12. A provisioning method performed by at least one computing device for a cloud service, the provisioning method comprising:

collecting resource utilization rates of individual cloud nodes of a plurality of cloud nodes, wherein a resource utilization rate of an individual cloud node includes a resource utilization rate for at least one of a processor or a memory of the individual cloud node;

receiving a regular instance request from at least one client;

determining whether there is a cloud node among the plurality of cloud nodes that satisfies a first condition, in which the collected resource utilization rate is less than a first threshold value;

determining a source cloud node from among the plurality of cloud nodes based on a determination that there is no cloud node among the plurality of cloud nodes that satisfies the first condition;

migrating at least some of spot instances pre-provisioned and operating on the source cloud node to a target cloud node;

provisioning a requested regular instance at the source cloud node;

receiving, from the at least one client, a plurality of spot instance requests within a current time window;

determining at least one cloud node among the plurality of cloud nodes that satisfies a second condition, in which the collected resource utilization rate is less than a second threshold value; and performing, at a last point of the current time window, provisioning for the requested plurality of spot instances based on a resource utilization rate of the determined at least one cloud node.

13. The provisioning method of claim 12, wherein the determining the source cloud node comprises:

determining whether a first cloud node among the plurality of cloud nodes satisfies the first condition according to spot instance migration or termination; and determining the first cloud node as the source cloud node based on a determination that the first cloud node satisfies the first condition.

14. The provisioning method of claim 13, wherein the determining the source cloud node further comprises:

determining, based on the first cloud node not satisfying the first condition, whether a second cloud node among the plurality of cloud nodes satisfies the first condition according to the spot instance migration or the termination.

15. The provisioning method of claim 12, wherein the migrating the at least some of the spot instances of the source cloud node comprises:

determining the target cloud node from among the plurality of cloud nodes based on a number of spot instances that can be provisioned in the target cloud node; and migrating the at least some of spot instances of the source cloud node to the determined target cloud node.

16. The provisioning method of claim 15, wherein the migrating to the determined target cloud node comprises:

migrating spot instances of the source cloud node as many as the number of spot instances that can be provisioned in the determined target cloud node;

wherein spot instances remaining on the source cloud node are terminated before the requested regular instance is provisioned.

17. The provisioning method of claim 12, wherein the second threshold value is set to a value greater than the first threshold value.

18. A provisioning system for a cloud service, the provisioning system comprising:

at least one processor; and at least one memory configured to store computer program executable by the at least one processor, wherein the computer program, when executed by the at least one processor, causes the at least one processor to perform:

collecting resource utilization rates of individual cloud nodes of a plurality of cloud nodes, wherein a resource utilization rate of an individual cloud node includes a resource utilization rate for at least one of a processor or a memory of the individual cloud node;

receiving a regular instance request from at least one client;

determining whether there is a cloud node among the plurality of cloud nodes that satisfies a first condition, in which the collected resource utilization rate is less than a first threshold value;

designating a specific cloud node from among the plurality of cloud nodes based on a determination that there is no cloud node among the plurality of cloud nodes that satisfies the first condition;

terminating at least some of spot instances pre-provisioned and operating on the specific cloud node and provisioning a requested regular instance in the specific cloud node;

receiving, from the at least one client, a plurality of spot instance requests within a current time window;

determining at least one cloud node among the plurality of cloud nodes that satisfies a second condition, in which the collected resource utilization rate is less than a second threshold value; and performing, at a last point of the current time window, provisioning for the requested plurality of spot instances based on a resource utilization rate of the determined at least one cloud node.

* * * * *